US012373855B2

(12) United States Patent
Cui et al.

(10) Patent No.: US 12,373,855 B2
(45) Date of Patent: *Jul. 29, 2025

(54) METHODS AND APPARATUS TO PROJECT RATINGS FOR FUTURE BROADCASTS OF MEDIA

(71) Applicant: The Nielsen Company (US), LLC, New York, NY (US)

(72) Inventors: Jingsong Cui, Pennington, NJ (US); Peter Campbell Doe, Ridgewood, NJ (US); Scott Sereday, Rochelle Park, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,300

(22) Filed: Apr. 17, 2024

(65) Prior Publication Data

US 2024/0265415 A1    Aug. 8, 2024

Related U.S. Application Data

(63) Continuation of application No. 18/301,183, filed on Apr. 14, 2023, now Pat. No. 11,989,746, which is a
(Continued)

(51) Int. Cl.
*G06Q 30/0202* (2023.01)
*G06Q 30/0201* (2023.01)
(Continued)

(52) U.S. Cl.
CPC ..... *G06Q 30/0202* (2013.01); *G06Q 30/0201* (2013.01); *G06Q 50/01* (2013.01);
(Continued)

(58) Field of Classification Search
None
See application file for complete search history.

(56) References Cited

U.S. PATENT DOCUMENTS 7,733,819 B2 *  6/2010  Lee ................. H04H 20/26
                                                         455/3.06
8,234,681 B2 *  7/2012  Hong ............. H04N 21/4622
                                                         725/112
(Continued)

FOREIGN PATENT DOCUMENTS

JP     2010130585    6/2010
KR     100889988    3/2009

OTHER PUBLICATIONS

International Preliminary Report on Patentability from International Application No. PCT/US2015/062554, dated May 30, 2017.
(Continued)

*Primary Examiner* — Ricky Chin
(74) *Attorney, Agent, or Firm* — McDonnell Boehnen Hulbert & Berghoff LLP

(57) ABSTRACT

Methods, apparatus, systems and articles of manufacture are disclosed to project ratings for future broadcasts of media. Disclosed example methods include normalizing, with a processor, audience measurement data corresponding to media exposure data, social media exposure data and programming information associated with a future quarter to determine normalized audience measurement data. Disclosed example methods also include classifying a media asset based on the programming information to determine a media asset classification. Disclosed example methods also include building, with the processor, a projection model based on a first subset of the normalized audience measurement data, the first subset of the normalized audience measurement data associated with a first time frame relative to the future quarter, the first subset of the normalized
(Continued)

audience measurement data based on the media asset classification, and applying, with the processor, the programming information to the projection model to project ratings for the media asset.

20 Claims, 19 Drawing Sheets

Related U.S. Application Data continuation of application No. 17/121,323, filed on Dec. 14, 2020, now Pat. No. 11,657,413, which is a continuation of application No. 16/036,614, filed on Jul. 16, 2018, now Pat. No. 10,867,308, which is a continuation of application No. 14/951,465, filed on Nov. 24, 2015, now abandoned.

(60) Provisional application No. 62/083,716, filed on Nov. 24, 2014.

(51) Int. Cl.
*G06Q 50/00* (2024.01)
*H04N 21/25* (2011.01)
*H04N 21/258* (2011.01)
*H04N 21/442* (2011.01)
*H04N 21/45* (2011.01)
*H04N 21/466* (2011.01)
*H04N 21/658* (2011.01)

(52) U.S. Cl.
CPC ........ *H04N 21/251* (2013.01); *H04N 21/252* (2013.01); *H04N 21/25891* (2013.01); *H04N 21/44226* (2020.08); *H04N 21/4532* (2013.01); *H04N 21/4665* (2013.01); *H04N 21/6582* (2013.01)

(56) References Cited

U.S. PATENT DOCUMENTS

| | | | |
|---|---|---|---|
| 8,265,989 B2 | 9/2012 | Dodge et al. | |
| 8,364,516 B2 | 1/2013 | Anderson et al. | |
| 8,774,225 B2* | 7/2014 | Vare | H04W 36/385 725/71 |
| 9,092,797 B2 | 7/2015 | Perez et al. | |
| 10,867,308 B2* | 12/2020 | Cui | H04N 21/252 |
| 11,657,413 B2* | 5/2023 | Cui | H04N 21/4665 725/14 |
| 11,989,746 B2* | 5/2024 | Cui | G06Q 30/0201 |
| 2001/0020236 A1 | 9/2001 | Cannon | |
| 2002/0143669 A1* | 10/2002 | Scheer | G06Q 20/203 705/28 |
| 2002/0169657 A1* | 11/2002 | Singh | G06Q 10/06 705/7.31 |
| 2005/0083401 A1* | 4/2005 | Mizutani | H04N 21/234318 375/E7.076 |
| 2006/0156366 A1* | 7/2006 | Vare | H04N 21/6405 725/117 |
| 2007/0136753 A1* | 6/2007 | Bovenschulte | H04N 7/17318 348/E7.071 |
| 2007/0147409 A1* | 6/2007 | Kallio | H04N 21/23614 370/431 |
| 2007/0268874 A1* | 11/2007 | Vare | H04N 21/4348 348/E5.102 |
| 2008/0052749 A1* | 2/2008 | Woolgar | H04N 21/235 348/E5.005 |
| 2008/0155587 A1* | 6/2008 | Sokola | H04H 60/45 725/44 |
| 2008/0249832 A1 | 10/2008 | Richardson et al. | |
| 2009/0021641 A1* | 1/2009 | Matsuura | H04N 21/4622 348/553 |
| 2009/0028081 A1* | 1/2009 | Song | H03M 13/2915 370/310 |
| 2009/0055866 A1* | 2/2009 | Song | H04H 20/93 725/39 |
| 2009/0055867 A1* | 2/2009 | Kim | H04H 60/14 725/39 |
| 2009/0055885 A1* | 2/2009 | Yoo | H04N 21/435 725/139 |
| 2009/0070848 A1* | 3/2009 | Kim | H04N 21/235 725/131 |
| 2009/0083779 A1* | 3/2009 | Shteyn | H04N 7/173 725/14 |
| 2009/0097429 A1* | 4/2009 | Lee | H04H 20/26 370/312 |
| 2009/0106297 A1 | 4/2009 | Wright et al. | |
| 2009/0158309 A1 | 6/2009 | Moon et al. | |
| 2009/0323683 A1* | 12/2009 | Song | H04N 21/4382 370/389 |
| 2010/0037278 A1* | 2/2010 | Yu | H04N 21/4345 725/110 |
| 2010/0106561 A1 | 4/2010 | Peredriy et al. | |
| 2010/0138290 A1* | 6/2010 | Zschocke | H04N 21/812 705/14.46 |
| 2010/0191854 A1* | 7/2010 | Isci | G06F 9/4893 718/1 |
| 2010/0195633 A1* | 8/2010 | Vare | H04W 36/385 370/338 |
| 2010/0242061 A1 | 9/2010 | Levitan | |
| 2010/0322424 A1* | 12/2010 | Choi | H04H 60/23 380/255 |
| 2011/0040612 A1 | 2/2011 | Simmons et al. | |
| 2011/0119126 A1 | 5/2011 | Park et al. | |
| 2011/0119709 A1* | 5/2011 | Kim | H04N 19/597 348/42 |
| 2011/0173515 A1* | 7/2011 | Lee | H04N 21/435 714/E11.032 |
| 2011/0196733 A1 | 8/2011 | Li et al. | |
| 2011/0299493 A1* | 12/2011 | Gutierrez | H04L 5/0053 370/329 |
| 2012/0004983 A1 | 1/2012 | Borthwick et al. | |
| 2012/0069892 A1* | 3/2012 | Kim | H03M 13/2933 375/232 |
| 2012/0084141 A1 | 4/2012 | Quinn et al. | |
| 2012/0254911 A1 | 10/2012 | Doe | |
| 2012/0259919 A1 | 10/2012 | Yan et al. | |
| 2012/0323675 A1 | 12/2012 | Paparo | |
| 2012/0324513 A1* | 12/2012 | Hwang | H04H 20/65 725/54 |
| 2013/0024900 A1* | 1/2013 | Suh | H04N 21/64322 725/100 |
| 2013/0291027 A1* | 10/2013 | Hwang | H04N 21/2362 725/62 |
| 2013/0297706 A1* | 11/2013 | Arme | H04N 21/8455 709/206 |
| 2013/0311408 A1* | 11/2013 | Bagga | G06Q 30/02 706/12 |
| 2013/0343468 A1* | 12/2013 | Ko | H04L 12/18 375/240.25 |
| 2013/0346154 A1* | 12/2013 | Holz | G06Q 30/0201 705/7.33 |
| 2014/0019208 A1 | 1/2014 | Brixius et al. | |
| 2014/0057018 A1 | 2/2014 | Zheng et al. | |
| 2014/0075018 A1* | 3/2014 | Maycotte | H04L 67/535 709/224 |
| 2014/0096169 A1* | 4/2014 | Dodson | H04N 21/6543 725/97 |
| 2014/0101244 A1* | 4/2014 | Klein | G06Q 10/00 709/204 |
| 2014/0130109 A1* | 5/2014 | Zhang | H04N 21/222 725/87 |
| 2014/0344861 A1* | 11/2014 | Berner | H04N 21/41407 725/46 |
| 2015/0150055 A1* | 5/2015 | Hwang | H04N 21/235 725/54 |
| 2015/0304691 A1* | 10/2015 | Yang | H04H 20/42 725/59 |

(56) References Cited

U.S. PATENT DOCUMENTS

| | | | |
|---|---|---|---|
| 2016/0019271 A1* | 1/2016 | Ma .................... | G06F 16/955 |
| | | | 707/756 |
| 2016/0119689 A1* | 4/2016 | Hood .............. | H04N 21/25891 |
| | | | 725/14 |
| 2016/0148228 A1 | 5/2016 | Cui et al. | |
| 2016/0150280 A1* | 5/2016 | Cui ................ | H04N 21/25891 |
| | | | 725/14 |
| 2016/0277133 A1* | 9/2016 | Stewart ............. | H04N 21/2362 |
| 2021/0174381 A1* | 6/2021 | Cui ................... | G06Q 30/0202 |
| 2023/0325858 A1* | 10/2023 | Cui ................... | H04N 21/4665 |
| | | | 725/14 |

OTHER PUBLICATIONS

International Preliminary Report on Patentability from International Application No. PCT/US2015/062551, dated May 30, 2017.
Pardee, "Beyond Ratings: Viewer Engagement," Media Research Club of Chicago, Apr. 2005.
Young, "MediaWorks Viewpoint; Optimedia Ranks Programs Based on Audience Involvement," Mar. 4, 2008.
Kaplan, "TNS Launches Product Placement Measurement Services," Jun. 20, 2005, retrieved from http://publications.mediapost.com/index.cfm?fuseaction=Articles.show/ArticleHomePage&art_aid=30917.
Sass, "Yes, That Billboard is Talking to You," Media Post Publications, Jan. 30, 2007.

* cited by examiner

| ET/P | Monday | Tuesday | ... | Friday | Saturday | Sunday |
|---|---|---|---|---|---|---|
| 8:00 | | Earth Stuff | | | Earth Stuff | Earth Stuff |
| 8:30 | | | | | | |
| ... | | | | | | |
| 11:00 | | Daytime Program; | | | Earth Quest Wknd | Earth Quest Wknd |
| 11:30 | | | | | | |
| ... | | | | | | |
| 15:00 | | Daytime Program; | | | Best of Us Marathon | Our Best Stuff Marathon |
| 15:30 | | | | | | |
| 16:00 | | Earth Journey | | | Best of Us Marathon | Our Best Stuff Marathon |
| 16:30 | | | | | | |
| 17:00 | | Earth Journey | | | Best of Us Marathon | Our Best Stuff Marathon |
| 17:30 | | | | | | |
| 18:00 | | Earth Journey | | | Best of Us Marathon | Our Best Stuff Marathon |
| 18:30 | | | | | | |
| 19:00 | Earth Stories | Earth Stories | ... | Earth Stories | Earth Stories Wknd | Earth Stories Wknd |
| 20:00 | Best of Earth 1 Series: rpts | Surviving Earth 1 rpts | ... | Growth Series 1 rpts | Earth 1 rpts | Outside 1 (10x60) |
| 21:00 | Best of Earth 2 Series: rpts | Surviving Earth 2 rpts | ... | Growth Series 2 (6x60) | Earth 2 rpts | Outside 2 (10x60) |
| 22:00 | Best of Earth 3 Series: rpts | Surviving Earth 3 (5 prem hrs) | ... | Tired S5 (6x60) | Earth 3 (11x60) | Outside 3 (10x60) |

| Title | Life After It Exploded | Outside Family | Here It Rains |
|---|---|---|---|
| QTR | 4Q15 | 4Q15 | 4Q15 |
| Length | 1x60 | 1x120 | 1x120 |
| Dates | Tue, 10/13 | Tue, 11/9 | Tue, 12/9 |
| Times | 22:00 1:00 | 21:00 0:00 | 21:00 23:00 |
| Total Plays | 2 | 2 | 2 |
| Total Hours | 2 | 4 | 4 |

FIG. 2

| Name | Type | Meaning |
|---|---|---|
| Title | String | Name of program |
| Type Identifier | String | Media type of media asset (e.g., series, special, repeat, new, etc.) |
| Day of Week | String | Day of week of broadcast of media asset |
| Broadcast Time | String | Time during media asset program was broadcast (e.g., 20:00-20:30) |
| Network | String | Name of network that broadcast the media asset |
| Genre | String | Media asset Genre (e.g., documentary, drama, variety, comedy, etc.) |
| Media Ratings | Floating | Program ratings associated with telecast |
| DayTime Ratings | Floating | Ratings including viewing during a particular day of week and time |
| Panelist ID | String | Unique identifiers for panelists who viewed the media asset |
| Message ID | Floating | Unique identifier of social media message |
| Message Timestamp | String | Posting time of social media message |
| Message Content | String | Content of social media message |
| Message Author | String | Unique identifier of posting user |
| Print Spending | Floating | Amount anticipated for spending via print media |
| Radio Spending | Floating | Amount anticipated for spending via radio |
| Broadcast Spending | Floating | Amount anticipated for spending via broadcast |

Raw Audience Measurement Data Variables Table

FIG. 3

| Name | Type | Meaning |
|---|---|---|
| Hour Ratings | Floating | Log(Calculated rating for corresponding day and time) |
| Series Ratings | Floating | Log(Average ratings for media asset of interest) |
| Genre Ratings | Floating | Log(Average ratings for media assets associated with genre of interest) |

Ratings_Predictive_Features_Table

FIG. 5

FIG. 6

Program Attributes Predictive Features Table

| Name | Type | Meaning |
|---|---|---|
| Day Mon | Boolean | 1 = day of week is Monday |
| Day Tues | Boolean | 1 = day of week is Tuesday |
| ... | ... | ... |
| Day SatSun | Boolean | 1 = day of week is Saturday or Sunday |
| Genre Documentary | Boolean | 1 = program genre is documentary |
| Genre Drama | Boolean | 1 = program genre is drama |
| Genre Comedy | Boolean | 1 = program genre is comedy |
| Originator ABC | Boolean | 1 = telecast is on network ABC |
| Originator XYZ | Boolean | 1 = telecast is on network XYZ |
| Hour Block | Int | 0 = 00:00 – 01:00; ...; 23 = 23:00 – 00:00 |
| Series Premiere | Boolean | 1 = program is a series and a premiere |
| Series New | Boolean | 1 = program is a series and a new episode |
| Series Repeat | Boolean | 1 = program is a series and a repeat episode |
| Special Movie | Boolean | 1 = program is a special and a movie |
| Special Sports | Boolean | 1 = program is a special and a sporting event |

| Name | Type | Meaning |
|---|---|---|
| SM_Count | Floating | Log(Number of posted social media messages of interest) |
| SM_UAuthors | Floating | Log(Number of unique authors who posted social media messages of interest) |

Social Media Predictive Features Table

FIG. 7

| Name | Type | Meaning |
|---|---|---|
| Broadcast Ads | Floating | Log(Amount anticipated for spending via broadcast) |
| Spot Ads | Floating | Log(Amount anticipated for spending via spot ads) |
| Satellite Ads | Floating | Log(Amount anticipated for spending via satellite ads) |
| Digital Ads | Floating | Log(Amount anticipated for spending via digital ads) |
| Print Ads | Floating | Log(Amount anticipated for spending via print ads) |
| Radio Ads | Floating | Log(Amount anticipated for spending via radio ads) |
| Other Ads | Floating | Log(Amount anticipated for spending via other ads) |
| Total Ad Spending | Floating | Log(Total amount anticipated for spending via ads) |

Advertisement Spending Predictive Features Table

FIG. 8

| Name | Type | Meaning |
|---|---|---|
| Demo W2554 | Floating | Log(Sum of number of women age 25-54) |
| Demo M2554 | Floating | Log(Sum of number of men age 25-54) |
| Demo P2554 | Floating | Log(Sum of number of persons age 25-54) |
| Demo W2549 | Floating | Log(Sum of number of women age 25-49) |
| Demo M2549 | Floating | Log(Sum of number of men age 25-49) |
| Demo P2549 | Floating | Log(Sum of number of persons age 25-49) |
| Demo W1849 | Floating | Log(Sum of number of women age 18-49) |
| Demo M1849 | Floating | Log(Sum of number of men age 18-49) |
| Demo P1849 | Floating | Log(Sum of number of persons age 18-49) |
| Demo W1834 | Floating | Log(Sum of number of women age 18-34) |
| Demo M1834 | Floating | Log(Sum of number of men age 18-34) |
| Demo P1834 | Floating | Log(Sum of number of persons age 18-34) |
| HH Block | Floating | Log(Sum of total households) |

Universe Estimates Predictive Features Table

FIG. 9

METHODS AND APPARATUS TO PROJECT RATINGS FOR FUTURE BROADCASTS OF MEDIA

CROSS-REFERENCE TO RELATED APPLICATIONS

This is a continuation of U.S. patent application Ser. No. 18/301,183, filed Apr. 14, 2023, which is a continuation of U.S. patent application Ser. No. 17/121,323, filed on Dec. 14, 2020, which is a continuation of U.S. patent application Ser. No. 16/036,614, filed Jul. 16, 2018, which is a continuation of U.S. patent application Ser. No. 14/951,465, filed Nov. 24, 2015, which claims the benefit of U.S. Provisional Patent Application No. 62/083,716, filed Nov. 24, 2014. Priority to U.S. patent application Ser. No. 17/121,323, U.S. patent application Ser. No. 16/036,614, U.S. patent application Ser. No. 14/951,465 and U.S. Provisional Patent Application No. 62/083,716 is hereby claimed. U.S. patent application Ser. No. 17/121,323, U.S. patent application Ser. No. 16/036,614, U.S. patent application Ser. No. 14/951,465 and U.S. Provisional Patent Application No. 62/083,716 are hereby incorporated by reference in their entireties.

FIELD OF THE DISCLOSURE

This disclosure relates generally to audience measurement, and, more particularly, to methods and apparatus to project ratings for future broadcasts of media.

BACKGROUND

Audience measurement of media (e.g., content and/or advertisements presented by any type of medium such as television, in theater movies, radio, Internet, etc.) is typically carried out by monitoring media exposure of panelists that are statistically selected to represent particular demographic groups. Audience measurement companies, such as The Nielsen Company (US), LLC, enroll households and persons to participate in measurement panels. By enrolling in these measurement panels, households and persons agree to allow the corresponding audience measurement company to monitor their exposure to information presentations, such as media output via a television, a radio, a computer, etc. Using various statistical methods, the collected media exposure data is processed to determine the size and/or demographic composition of the audience(s) for media of interest. The audience size and/or demographic information is valuable to, for example, advertisers, broadcasters, content providers, manufacturers, retailers, product developers, and/or other entities. For example, audience size and demographic information is a factor in the placement of advertisements, in valuing commercial time slots during a particular program and/or generating ratings for piece(s) of media.

BRIEF DESCRIPTION OF THE DRAWINGS

FIG. 2 is an example upfront programming schedule that may be used by the example central facility of FIG. 1 to determine media asset(s) for which to project ratings.

FIG. 3 is an example data table that may be used by the example central facility of FIG. 1 to store raw data variables in the example raw data database of FIG. 1.

FIG. 5 is an example data table that may be used by the example data transformer of FIGS. 1 and/or 4 to transform ratings data variables into ratings predictive features.

FIG. 6 is an example data table that may be used by the example data transformer of FIGS. 1 and/or 4 to transform program attributes data variables into program attributes predictive features.

FIG. 7 is an example data table that may be used by the example data transformer of FIGS. 1 and/or 4 to transform social media data variables into social media predictive features.

FIG. 8 is an example data table that may be used by the example data transformer of FIGS. 1 and/or 4 to transform spending data variables into advertisement spending predictive features.

FIG. 9 is an example data table that may be used by the example data transformer of FIGS. 1 and/or 4 to transform universe estimates data variables into universe estimate predictive features.

Wherever possible, the same reference numbers will be used throughout the drawing(s) and accompanying written description to refer to the same or like parts.

DETAILED DESCRIPTION

Figure 1:
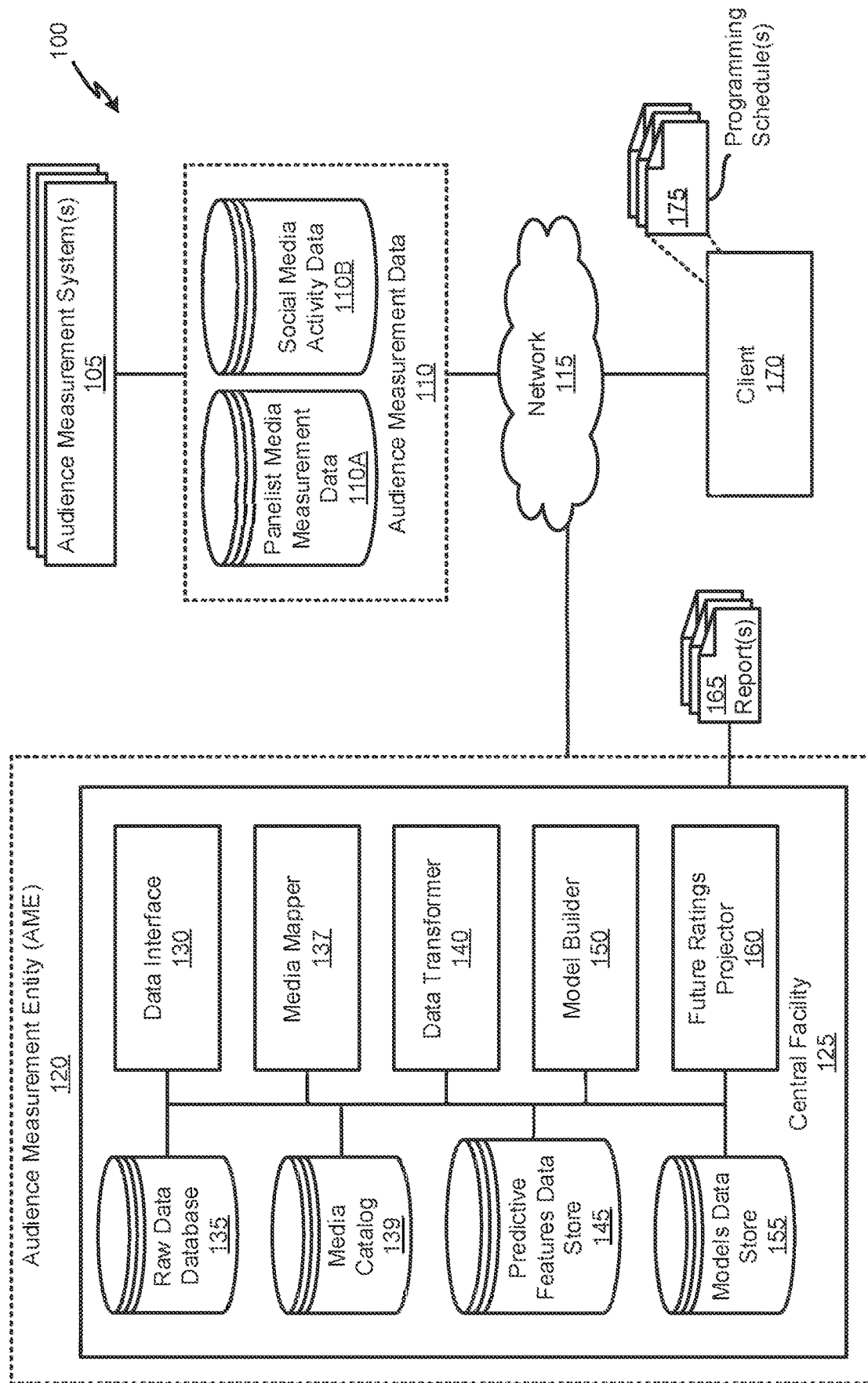
FIG. 1 illustrates an example system for audience measurement analysis implemented in accordance with the teachings of this disclosure to project ratings for future broadcasts of media.

Examples disclosed herein facilitate projecting ratings for future broadcasts of media. Disclosed examples enable estimating television ratings for households that will tune to (or persons that will be exposed to) a program in a future quarter. For example, near-term projections enable estimating the television ratings for a program that will be broadcast within two quarters of the current quarter, while upfront projections enable estimating the television ratings for a program that will be broadcast in three or more quarters from the current quarter.

Exposure information (e.g., ratings) may be useful for determining a marketing campaign and/or evaluating the effectiveness of a marketing campaign. For example, an advertiser who wants exposure of their asset (e.g., a product, a service, etc.) to reach a specific audience will place advertisements in media (e.g., a television program) whose audience represents the characteristics of the target market. In some examples, networks determine the cost of including an advertisement in their media based on the ratings of the media. For example, a high rating for a television program represents a large number of audience members who tuned to (or were exposed to) the television program. In such instances, the larger the audience of a television program (e.g., a higher rating), the more networks can charge for advertisements during the program.

In the North American television industry, an upfront is a meeting hosted at the start of important advertising sales periods by television network executives, attended by the press and major advertisers. It is so named because of its main purpose, to allow marketers to buy television commercial airtime "up front," or several months before a television season begins. In some examples disclosed herein, an upfront projection model is developed to predict upfront TV ratings. For example, examples disclosed herein include a central facility that is operated by an audience measurement entity (AME). In some examples, the central facility and/or the AME may collect measurement information (e.g., raw data inputs) including historical TV ratings (e.g., NPower historical TV ratings), social media information (e.g., information collected from social media services such as Twitter, Google+, Facebook, Instagram, etc.), genre information (e.g., genre data derived from NPower genre data), sponsored-media spending (e.g., ad-spending data provided by, for example, a media provider), etc. NPower is an example platform of historical TV ratings developed by The Nielsen Company (US), LLC. The NPower platform includes related applications and tools that provide measurement of audience measurements in the US and globally, such as National TV Toolbox. In some examples, the central facility incorporates additional information, such as TV brand effects (TVBE) information. TVBE is an example metric developed by The Nielsen Company (US), LLC to measure a TV advertisement's "breakthrough" or "resonance."

In some disclosed examples, the central facility develops models to predict upfront TV ratings using telecast-level data. In some such examples, the central facility generates the predictions for each telecast. The telecast predictions may be aggregated to provide program-level and/or network-level predictions. Separate models may also be developed at a program level. In some examples, the central facility mines historical database(s) to identify programs that can be used to improve the predictions of new programs (e.g., relevant programs). The relevancy of past programs for predicting future programs is measured in several dimensions, including, for example, program content, program titles, network line-up (including day parts), etc. In some examples, historical TV ratings have been shown to significantly improve the accuracy of such prediction models, and, in some instances, have accounted for an average 80% of the explanatory power of the model. The example central facility may transform the raw data inputs (e.g., historical TV ratings, social media information, genre information, sponsored-media spending information and/or TVBE, etc.) into predictive variables/features that are used as predictors in the predictive models. In some examples, the central facility identifies (e.g., automatically identifies) the predictive features among a pool of many features, as well as the most efficient techniques and/or algorithms to utilize these features. Example techniques and/or algorithms used by the central facility include statistical analysis (e.g., regression models, time-series models), data and text mining, machine learning models and/or agent-based models. In some examples, the process of data mining and deep learning is automated to minimize (e.g., reduce) manual/subjective input and to reduce the amount of time required.

In some examples, the central facility processes the data over 2-4 weeks to build the predictive models. In some such examples, once built, the central facility applies the model over a 2-day period to predict new data. The longevity of the model (e.g., how often the model needs to be re-calibrated) depends on how fast the market dynamics change. For example, the model may be re-calibrated once-a-year.

In some examples, when historical ratings are used, the central facility uses a gap of 1 quarter (13 weeks) when developing the projection models. This gap, though, makes it more challenging to achieve better accuracy, but nevertheless is desirable for mid-term projections, such as the case of upfront projection. To measure the developed model's performance, a mean percentage error metric (e.g., percent (actual/forecast)−1) and/or R-sq metric (e.g., measured between actual ratings and predicted ratings) may be used.

In some examples, the central facility includes all program information when developing the projection models. In some such examples, the projection model includes only historical ratings (e.g., information collected via the NPower platform). In some examples, the projection model is tested using a hold-out test data set. Hold-out test data sets were not used to train the model, and, thus, are better suited to measure how the projection models perform for the purpose of rating predictions.

FIG. 1 is a diagram of an example environment in which an example system 100 constructed in accordance with the teachings of this disclosure operates to project future ratings for media of interest. The example system 100 of FIG. 1 includes one or more audience measurement system(s) 105, an example client 170 and an example central facility 125 to facilitate projecting future ratings for media of interest in accordance with the teachings of this disclosure. In the illustrated example of FIG. 1, the central facility 125 estimates a percentage of a universe of TV households (or other specified group) that will tune to a program in a future period (e.g., in the next quarter (e.g., fiscal quarter), in three quarters, etc.) by generating ratings projection model(s) based on, for example, historical ratings, program characteristics, social media indicators, advertisement spending, programming schedules, etc.

The example system 100 of FIG. 1 includes the one or more audience measurement system(s) 105 to collect audience measurement data 110 from panelists and non-panelists. The example audience measurement system(s) 105 of FIG. 1 collect panelist media measurement data 110A via, for example, people meters operating in statistically-selected households, set-top boxes and/or other media devices (e.g., such as digital video recorders, personal computers, tablet computers, smartphones, etc.) capable of monitoring and returning monitored data for media presentations, etc. The example panelist media measurement data 110A of FIG. 1 includes media exposure data such as live exposure data, delayed exposure data (e.g., relative to time-shifted viewing of media via, for example, a digital video recorder and/or video on-demand), media performance data, such as TV ratings (e.g., historical TV ratings), program characteristics (e.g., attributes), such as broadcast day-of-week information, broadcast time information, originator information (e.g., a network or channel that broadcasts the media), genre information, universe estimates (e.g., an estimated number of actual households or people from which a sample will be taken and to which data from the sample will be projected), etc. In some examples, the panelist media measurement data 110A is associated with demographic information (e.g., gender, age, income, etc.) of the panelists exposed to the media.

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

The example audience measurement system(s) 105 of FIG. 1 also collect social media activity data 110B related to media via, for example, social media servers that provide social media services to users of the social media server. As used herein, the term social media services is defined to be a service provided to users to enable users to share information (e.g., text, images, data, etc.) in a virtual community and/or network. Example social media services may include, for example, Internet forums (e.g., a message board), biogs, micro-biogs (e.g., Twitter®), social networks (e.g., Facebook®, Linkedin, Instagram, etc.), etc. For example, the audience measurement system(s) 105 may monitor social media messages communicated via social media services and identify media-exposure social media messages (e.g., social media messages that reference at least one media asset (e.g., media and/or a media event)). The example audience measurement system(s) 105 may filter the media-exposure social media messages for media-exposure social media messages of interest (e.g., social media messages that reference media of interest).

The example social media activity data 110B of FIG. 1 includes one or more of message identifying information (e.g., a message identifier, a message author, etc.), timestamp information indicative of when the social media message was posted and/or viewed, the content of the social media message and an identifier of the media asset referenced in the media-exposure social media message. In some examples, the audience measurement system(s) 105 may process the media-exposure social media messages of interest and aggregate information related to the social media messages. For example, the audience measurement system(s) 105 may determine a count of the media-exposure social media messages of interest, may determine a number of unique authors who posted the media-exposure social media messages of interest, may determine a number of impressions of (e.g., exposure to) the media-exposure social media messages of interest, etc.

In the illustrated example of FIG. 1, the audience measurement system(s) 105 send the audience measurement data 110 to the central facility 125 via an example network 115. The example network 115 of the illustrated example of FIG. 1 is the Internet. However, the example network 115 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 115 enables the central facility 125 to be in communication with the audience measurement system(s) 105. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example, the central facility 125 is operated by an audience measurement entity (AME) 120 (sometimes referred to as an "audience analytics entity" (AAE)). The example AME 120 of the illustrated example of FIG. 1 is an entity such as The Nielsen Company (US), LLC that monitors and/or reports exposure to media and operates as a neutral third party. That is, in the illustrated example, the audience measurement entity 120 does not provide media (e.g., content and/or advertisements) to end users. This un-involvement with the media production and/or delivery ensures the neutral status of the audience measurement entity 120 and, thus, enhances the trusted nature of the data the AME 120 collects and processes. The reports generated by the audience measurement entity may identify aspects of media usage, such as the number of people who are watching television programs and characteristics of the audiences (e.g., demographic information of who is watching the television programs, when they are watching the television programs, etc.).

The example AME 120 of FIG. 1 operates the central facility 125 to facilitate future projections of a media asset of interest. As used herein, a media asset of interest is a particular media program (e.g., identified via a program identifier such as a title, an alphanumeric code, season and episode numbers, etc.) that is being analyzed (e.g., for a report). In the illustrated example of FIG. 1, the central facility 125 generates one or more reports at the request of an example client 170 (e.g., a television network, an advertiser, etc.). In the illustrated example, the client 170 requests projections for media of interest that will be broadcast in the near-term (e.g., within two quarters from the current quarter) or at a later quarter based on, for example, historical ratings, program characteristics, social media indicators, advertisement spending, programming schedules, etc. In the illustrated example, the client 170 provides the AME 120 an example programming schedule 175 that includes scheduling information for the quarter of interest (e.g., the quarter for which the projections are being generated). In some examples, the programming schedule 175 indicates specific information (e.g., program characteristics) regarding the media asset of interest such as whether the media asset is a series (e.g., a season premier, a repeat episode, a new episode, etc.), a special (e.g., a one-time event such as a movie, a sporting event, etc.), etc. In some examples, the programming schedule 175 indicates general information, such as a program title and broadcast times of the media. An example upfront programming schedule 200 of the illustrated example of FIG. 2 illustrates an example programming schedule 175 for a quarter of interest that may be provided by the client 170.

In some examples, the client 170 may use the reports provided by the example central facility 125 to analyze exposure to media and take actions accordingly. For example, a television network may increase the cost of an advertising spot (e.g., commercial advertising time either available for sale or purchase from network) for media associated with relatively greater viewership than other programs, may determine to increase the number of episodes of the media, etc. In some examples, the client 170 (e.g., the television network) may determine whether to discontinue producing a media program associated with relatively lower viewership, reduce the cost of an advertising spot for media that may be projected to have lower ratings, etc. As described above, it is beneficial for a client (e.g., a television network) to accurately project ratings for the media of asset since the client may have to pay restitution to an advertiser if the projected ratings are higher than the actual ratings and, thus, the client charted too much for the advertisement spot. Additionally or alternatively, the client may value an advertisement spot too low and, thus, not maximize its gains from the media.

The central facility 125 of the illustrated example includes a server and/or database that collects and/or receives audience measurement data related to media assets (e.g., media and/or media events) and projects future ratings (e.g., near-term ratings or upfront ratings) for the media assets of interest. In some examples, the central facility 125 is implemented using multiple devices and/or the audience measurement system(s) 105 is (are) implemented using multiple devices. For example, the central facility 125 and/or the audience measurement system(s) 105 may include disk arrays and/or multiple workstations (e.g., desktop computers, workstation servers, laptops, etc.) in communication with one another. In the illustrated example, the central facility 125 is in communication with the audience measurement system(s) 105 via one or more wired and/or wireless networks represented by the network 115.

The example central facility 125 of the illustrated example of FIG. 1 processes the audience measurement data 110 returned by the audience measurement system(s) 105 to predict time-shifted exposure to media. For example, the central facility 125 may process the audience measurement data 110 to determine a relationship between predictive features (sometimes referred to herein as "variables," "predictors" or "factors") identified from the audience measurement data 110 and measured ratings to build one or more projection models. For example, the central facility 125 may generate a first projection model to project ratings for media that will be broadcast in one or two quarters (e.g., a near-term projection model) and/or may generate a second projection model to project ratings for media that will be broadcast in three or more quarters from the current quarter. The example central facility 125 may then apply data associated with the media asset of interest and the quarter of interest to a projection model to determine a ratings projection for the media asset.

In the illustrated example of FIG. 1, the central facility 125 includes an example data interface 130, an example raw data database 135, an example media mapper 137, an example media catalog 139, an example data transformer 140, an example predicted features data store 145, an example model builder 150, an example models data store 155 and an example future ratings projector 160. In the illustrated example of FIG. 1, the example central facility 125 includes the example data interface 130 to provide an interface between the network 115 and the central facility 125. For example, the data interface 130 may be a wired network interface, a wireless network interface, a Bluetooth® network interface, etc. and may include the associated software and/or libraries needed to facilitate communication between the network 115 and the central facility 125. In the illustrated example of FIG. 1, the data interface 130 receives the audience measurement data 110 returned by the example audience measurement system(s) 105 of FIG. 1. In the illustrated example, the data interface 130 of FIG. 1 also receives the programming schedule 175 provided by the client 170 of FIG. 1. The example data interface 130 records the audience measurement data 110 and the programming schedule 175 in the example raw data database 135.

In the illustrated example of FIG. 1, the example central facility 125 includes the example raw data database 135 to record data (e.g., the example audience measurement data 110, the programming schedule 175, etc.) provided by the audience measurement system(s) 105 and/or the client 170 via the example data interface 130. An example data table 200 of the illustrated example of FIG. 2 illustrates example raw data variables that may be recorded in the example raw data database 135. The example raw data database 135 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example raw data database 135 may additionally or alternatively be implemented by one or more double data rate (DDR) memories, such as DDR, DDR2, DDR3, mobile DDR (mDDR), etc. The example raw data database 135 may additionally or alternatively be implemented by one or more mass storage devices such as hard disk drive(s), compact disk drive(s), digital versatile disk drive(s), etc. While in the illustrated example the raw data database 135 is illustrated as a single database, the raw data database 135 may be implemented by any number and/or type(s) of databases.

The example central facility 125 of the illustrated example of FIG. 1 combines multiple disparate data sets to enable modeling and assessment of multiple inputs simultaneously. In the illustrated example of FIG. 1, the central facility 125 includes the example media mapper 137 to identify and/or determine media referencing the same media and/or media that is related. For example, the media mapper 137 may identify a reference to a program in the panelist media measurement data 110A by a first name (e.g., "How To Run A Steakhouse"), and may identify a social media message in the social media activity data 110B referencing the same program by a second name (e.g., "#HTRAB"). In such instances, the example media mapper 137 maps the first name to the second name. In some examples, the media mapper 137 may identify a third name included in the audience measurement data 110 that includes a typographical error in the program name (e.g., "How Too Run A Steakhouse"). In such instances, the example media mapper 137 maps the first name, the second name and the third name to the same program via, for example, a media identifier (e.g., "01234").

In some examples, the media mapper 137 may determine that a first program and a second program are not referencing the same program, but are related to each other. For example, the second program may be a spin-off of the first program. The example media mapper 137 records the media mappings in the example media catalog 139. The example media mapper 137 uses title names to identify and/or determine media referencing the same media and/or media that is related. However, any other technique of mapping related media may additionally or alternatively be used. For example, the media mapper 137 may parse the raw data database 135 and identify related media based on broadcast day and times (e.g., Tuesday, 8:00 pm), media director(s), character name(s), actor and actress name(s), etc.

In the illustrated example of FIG. 1, the example central facility 125 includes the example media catalog 139 to record mappings provided by the example media matter 137. The example media catalog 139 may be implemented by a volatile memory (e.g., an SDRAM, DRAM, RDRAM, etc.) and/or a non-volatile memory (e.g., flash memory). The example media catalog 139 may additionally or alternatively be implemented by one or more DDR memories, such as DDR DDR2, DDR3, mDDR, etc. The example media catalog 139 may additionally or alternatively be implemented by one or more mass storage devices such as hard disk drive(s), compact disk drive(s), digital versatile disk drive(s), etc. While in the illustrated example the media catalog 139 is illustrated as a single database, the media catalog 139 may be implemented by any number and/or type(s) of databases.

As described above, at least some of the variables are transformed (e.g., modified and/or manipulated) from their raw form in the raw data database 135 to be more meaningfully handled when building the projection models and projecting ratings for future broadcast(s) of media. For example, raw data may be multiplied, aggregated, averaged, etc., and stored as predictive features (sometimes referred to herein as "transformed," "sanitized," "engineered," "normalized" or "recoded" data) prior to generating the projection models used to project the ratings for the media of interest.

In the illustrated example of FIG. 1, the example central facility 125 includes the example data transformer 140 to translate the audience measurement data 110 received from the example audience measurement system(s) 105 into a form more meaningfully handled by the example model builder 150 (e.g., into predictive features). For example, the data transformer 140 of FIG. 1 may retrieve and/or query the audience measurement data 110 recorded in the example raw data database 135 and normalize the disparate data to a common scale. In the illustrated example, the example data transformer 140 modifies and/or manipulates audience measurement data 110 based on the type of data. For example, the data transformer 140 may translate (e.g., map) data that is a string data type (e.g., "Day-of-Week" is "Tuesday") to a Boolean data type (e.g., "Day Tues" is set to true (e.g., "1")).

As described above and in connection with the example data table 300 of FIG. 3, the audience measurement data 110 may be in different data formats and/or different units of measure. For example, program characteristic information, such as program title, episode and season identifying information, day of week, broadcast time, broadcast quarter, broadcast network and genre may be stored as string data types. Current and historical ratings information may be represented via television rating scores (e.g., floating data types). Social media indicators (e.g., message identifiers, message timestamps, message content, message author identifiers, message impression information, etc.) may be represented as string data types. In the illustrated example of FIG. 1, the data transformer 140 normalizes the audience measurement data 110 into numerical data types (e.g., Boolean data types, integer data types and/or floating data types). The example data transformer 140 of FIG. 1 records transformed data in the example predictive features data store 145.

In the illustrated example of FIG. 1, the example central facility 125 includes the example predictive features data store 145 to record transformed data provided by the example data transformer 140. Example data tables 500, 600, 700, 800 and 900 of the illustrated examples of FIGS. 5, 6, 7, 8 and 9, respectively, illustrate example translated data variables that may be recorded in the example predictive features data store 145. The example predictive features data store 145 may be implemented by a volatile memory (e.g., an SDRAM, DRAM, RDRAM, etc.) and/or a non-volatile memory (e.g., flash memory). The example predictive features data store 145 may additionally or alternatively be implemented by one or more DDR memories, such as DDR, DDR2, DDR3, mDDR, etc. The example predictive features data store 145 may additionally or alternatively be implemented by one or more mass storage devices such as hard disk drive(s), compact disk drive(s), digital versatile disk drive(s), etc. While in the illustrated example the predictive features data store 145 is illustrated as a single database, the predictive features data store 145 may be implemented by any number and/or type(s) of databases.

In the illustrated example of FIG. 1, the central facility 125 includes the example model builder 150 to build one or more projection model(s) that may be used to project ratings for future broadcast(s) of media (e.g., near-term projections, upfront projections, etc.). In the illustrated example, the model builder 150 determines a relationship between one or more predictive features retrieved from the example predictive features data store 145 and historical ratings to build one or more projection model(s).

In the illustrated example of FIG. 1, the model builder 150 utilizes a Stochastic Gradient Boosting Machine (GBM) to generate the projection models. GBM is a family of machine-learning techniques for regression problems. In the illustrated example, the model builder 150 produces a prediction model in the form of an ensemble of weak prediction models, typically referred to as "decision trees." By utilizing GBM, the example model builder 150 is able to model complex relationships, including when using non-uniform data sources and/or missing information.

In the illustrated example of FIG. 1, the model builder 150 applies historical values of one or more predictive features from the predictive features data store 145 to train the model using GBM. However, any other technique may additionally or alternatively be used to train a model. For example, the model builder 150 may utilize an equation representative of a projection model that may be built by the example model builder 150. In some such instances, the model builder 150 may apply historical values of one or more predictive features ($X_i$) from the predictive features data store 145 to the representative equation to train the model to determine value of coefficients ($a_i$) that modify the predictive features ($X_i$)

In the illustrated example of FIG. 1, the example model builder 150 builds different models to project ratings for future broadcast(s) of media based on the quarter of interest and/or future programming information available. For example, the model builder 150 may apply different sets of predictive features to the GBM to determine the coefficient values ($a_i$) of the predicative features ($X_i$) based on the quarter of interest (e.g., one quarter in the future, three quarters in the future, etc.).

In the illustrated example of FIG. 1, the example model builder 150 selects the predictive features ($X_i$) to apply to GBM based on the quarter of interest and attributes of the media assets included in the corresponding programming schedule 175. For example, the model builder 150 may build a first projection model by applying all available historical information (e.g., historical ratings for media broadcast at the same time and day of week, historical ratings for related media, etc.), social media indicators (e.g., number of social media messages posted referencing media of interest, number of unique authors posting social media messages referencing media of interest, etc.), etc. to the GBM. The example model builder 150 may build a second projection model by applying a subset of the historical information available to the GBM. For example, the model builder 150 may exclude historical information equivalent to the gap of interest (e.g., the number of quarters between the current quarter and the quarter of interest).

In some such instances, while the general technique of GBM is used to build projection models, the predictive features included in the corresponding models is different and, as a result, the ensemble of prediction models differ between the two projection models. While the illustrated example associates near-term projection models with one or two quarters in the future and associates the upfront projection models with three or more quarters in the futures, other time periods (e.g., "gaps") may additionally or alternatively be used. The example model builder 150 of FIG. 1 stores the generated projection models in the example models data store 155.

In the illustrated example of FIG. 1, the example central facility 125 includes the example models data store 155 to store projection models generated by the example model builder 150. The example models data store 155 may be implemented by a volatile memory (e.g., SDRAM, DRAM, RDRAM, etc.) and/or a non-volatile memory (e.g., flash memory). The example models data store 155 may additionally or alternatively be implemented by one or more DDR memories, such as DDR, DDR2, DDR3, mDDR, etc. The example models data store 155 may additionally or alternatively be implemented by one or more mass storage devices such as hard disk drive(s), compact disk drive(s), digital versatile disk drive(s), etc. While in the illustrated example the models data store 155 is illustrated as a single database, the models data store 155 may be implemented by any number and/or type(s) of databases.

In the illustrated example of FIG. 1, the central facility 125 includes the example future ratings projector 160 to use the projection models generated by the example model builder 150 to project ratings for future broadcasts of media. For example, the future ratings projector 160 may apply data related to a media asset of interest to predict viewership of the media asset of interest in three quarters from the current quarter. In the illustrated example, the future ratings projector 160 uses program characteristics of the media asset of interest and the quarter of interest to select a projection model to apply. For example, the future ratings projector 160 may determine a projection model based on the gap of interest and the amount of future information available for the media asset of interest.

In the illustrated example of FIG. 1, in response to selecting the projection model to apply, the example future ratings projector 160 retrieves data related to the media asset of interest from the predictive features data store 145.

The example future ratings projector 160 of the illustrated example of FIG. 1 applies the data related to a media asset of interest to the generated projection models stored in the example models data store 155 to generate reports 165 predicting the ratings for a future broadcast of the media asset of interest. For example, the future ratings projector 160 may estimate the ratings for a media asset of interest by applying program attributes information, social media indicators information and/or media performance information to a projection model. As used herein, program attributes information includes genre information of the media asset of interest, media type information (e.g., a series, a special, a repeat, a premiere, a new episode, etc.), day-of-week information related to the media asset of interest, broadcast time related to the media asset of interest, originator (e.g., network or channel) information related to the media asset of interest, etc. As used herein, social media indicators information includes a social media messages count related to the number of media-exposure social media messages of interest, a social media unique authors count related to the number of unique authors who posted media-exposure social media messages of interest, a social media impressions count related to the number of users who were exposed to the media-exposure social media messages of interest, etc. As used herein, media performance information includes ratings associated with the media asset of interest (e.g., historical ratings associated with the media asset of interest), a day and time of broadcast (e.g., Tuesdays at 8:00 pm), etc.

FIG. 2 is a portion of an example upfront programming schedule 200 that may be used by the example central facility 125 of FIG. 1 to forecast ratings for media broadcast during a corresponding future quarter. In the illustrated example, the upfront programming schedule 200 is provided by the client 170 when requesting the future broadcast rating projections. The example upfront programming schedule 200 includes day of week and broadcast times of different media including primetime media 205 and daytime media 210. The example upfront programming schedule 200 also includes scheduled broadcast times of special media 215.

In the illustrated example of FIG. 2, the primetime media 205 is associated with television series that run on a repeating basis. For example, a sitcom that airs on a weekly basis is a series. In the illustrated example, a series episode may be a premiere episode (e.g., a first episode of a season), a new episode (e.g., a first time that the particular episode is broadcast) or a repeat episode. As described below, projecting the ratings for a broadcast of a series in a future quarter is advantageous because additional information is known. For example, historical series performance information may be utilized when forming the projections. In addition, future programming information is known about the series. For example, a series that is a comedy will tend to still be a comedy in a future quarter.

In the illustrated example of FIG. 2, the daytime media 210 is associated with little or no future programming information availability. As described below, when media is classified as daytime media or no future programming information is available for the media asset, then the example central facility 125 of FIG. 1 utilizes historical program characteristics for particular days of the week and broadcast times when projecting future ratings.

In the illustrated example of FIG. 2, the special media 215 is associated with one-time events such as movies, sporting events, marathons (e.g., ten back-to-back episodes of a series, etc.), etc. Similar to daytime media, special media 215 does not have past series historical performance information. For example, in the illustrated example of FIG. 2, the special "Life After It Exploded" is a movie that will be broadcast two times in the fourth quarter of 2015 (e.g., at 22:00 and then at 01:00 on Oct. 13, 2015. In such instances, past historical ratings for the media asset (e.g., the special "Life After It Exploded") are not available and/or are not reliable predictors for future ratings projections. However, in the illustrated example, the central facility 125 utilizes program characteristics such as genre and whether the special media 215 is a movie, a special, etc., to project future ratings.

FIG. 3 is an example data table 300 that lists raw audience measurement data variables that the example data interface 130 of FIG. 1 may store in the example raw data database 135 of FIG. 1. In the illustrated example of FIG. 3, the raw audience measurement data variables represent the data collected and/or provided by the audience measurement system(s) 105 of FIG. 1 and/or the client 170 of FIG. 1. For example, the raw audience measurement data variables may include the panelist media measurement data 110A collected via, for example, people meters operating in statistically-selected households, set-top boxes and/or other media devices (e.g., such as digital video recorders, personal computers, tablet computers, smartphones, etc.) capable of monitoring and returning monitored data for media presentations, etc. The example raw audience measurement data variables included in the data table 300 may also include the social media activity data 110B associated with media of interest referenced by social media messages collected via, for example, social media servers that provide social media services to users of the social media server. In some examples, the raw audience measurement data may also include the programming schedule 175 and additional client-provided data, such as the amount of money and/or resources the client anticipates spending on promoting the media assets for the quarter.

The example data table 300 of the illustrated example of FIG. 3 includes a variable name identifier column 305, a variable data type identifier column 310 and a variable meaning identifier column 315. The example variable name identifier column 305 indicates example variables that may be associated with a telecast and/or may be useful for projecting media ratings. The example variable data type identifier column 310 indicates a data type of the corresponding variable. The example variable meaning identifier column 315 provides a brief description of the value associated with the corresponding variable. While three example variable identifier columns are represented in the example data table 300 of FIG. 3, more or fewer variable identifier columns may be represented in the example data table 300. For example, the example data table 300 may additionally or alternatively include a variable identifier column indicative of the source of the corresponding data (e.g., the example panelist media measurement data 110A, the example social media activity data 110B, the client 170, etc.).

The example data table 300 of the illustrated example of FIG. 3 includes sixteen example rows corresponding to example raw audience measurement data variables. The example first block of rows 350 identifies attributes and/or characteristics of a media asset and is stored as strings. For example, the "Title" variable identifies the name of the media asset (e.g., "Sports Stuff"), the "Type Identifier" variable identifies the media type of the media asset (e.g., a "series," a "movie," etc.), the "Day of Week" variable identifies the day of the week that the media asset was broadcast (e.g., "Tuesday"), the "Broadcast Time" variable identifies the time during which the media asset was broadcast (e.g., "20:00-20:30"), the "Network" variable identifies on which network the media asset was broadcast (e.g., Channel "ABC"), and the "Genre" variable identifies the genre that the media asset is classified (e.g., a "comedy").

In the example data table 300 of FIG. 3, the second example block of rows 355 identifies ratings information associated with a media asset and the corresponding information is stored as floating type data. For example, the "Media Ratings" variable identifies the program ratings associated with the broadcast of the program (e.g., "1.01"). In the illustrated example, the ratings correspond to the viewership during the original broadcast of the program and also include time-shifted incremental viewing that takes place via, for example, a DVR or video-on-demand (VOD) service during the following 7 days (e.g., "live+7" ratings). In some examples, the data table 300 includes ratings information for specific time and days of the week. For example, telecast-level ratings measure viewership at, for example, one-minute periods. In such instances, the "Day-Time ratings" variable represents the number of people who were tuned to a particular channel at a particular minute. For example, a first "DayTime ratings" value may represent the number of people who were watching channel "ABC" between "20:00 and 20:01" on "Tuesday," and a second "DayTime ratings" value may represent the number of people who were watching channel "ABC" between "20:01 and 20:02" on "Tuesday." Although the example data table 300 includes "live+7" ratings, other ratings may additionally or alternatively be used. For example, the ratings information in the data table 300 may include "live" ratings, "live+same day" ratings (e.g., ratings that represent the number of people who viewed the media asset during its original broadcast time and/or during the same day as the original broadcast), "C3" ratings (e.g., ratings (sometimes presented as a percentage) that represent the number of people who viewed a commercial spot during its original broadcast time and/or within the following three days of the original broadcast), "C3" impressions, etc.

In the illustrated example of FIG. 3, the example row 365 indicates the "Panelist ID" variable is stored as a string and uniquely identifies the panelist who provided the viewership information. For example, panelists who are provided people meters may be assigned a panelist identifier to monitor the media exposure of the panelist. In the illustrated example, the panelist identifier (ID) is an obfuscated alphanumeric string to protect the identity of the panelist. In some examples, the panelist identifier is obfuscated in a manner so that the same obfuscated panelist identifier information corresponds to the same panelist. In this manner, user activities may be monitored for particular users without exposing sensitive information regarding the panelist. However, any other approach to protecting the privacy of a panelist may additionally or alternatively be used. In some examples, the panelist identifier is used to identify demographic information associated with the panelist. For example, the panelist identifier "0123" may link to demographic information indicating the panelist is a male, age 19-49.

In the example data table 300 of FIG. 3, the third example block of rows 370 identifies information regarding social media messages. For example, the "Message ID" variable is stored as a floating data type and is a unique identifier of a social media message. In the illustrated example, the example "Message Timestamp" variable is stored as a string data type and identifies the date and/or time when the corresponding social media message was posted. In the illustrated example, the example "Message Content" variable is stored as a string data type and identifies the content of corresponding social media message. In the illustrated example, the example "Message Author" variable is stored as a string data type and identifies the author of the corresponding social media message.

In the example data table 300 of FIG. 3, the fourth example block of rows 375 represents different vehicles of advertising and represent the amount of money and/or resources that are allocated to advertising the media asset via the corresponding vehicle. In the illustrated example, the advertising spending amounts are stored as floating values. Although the example data table 300 includes three different vehicles for advertisement spending, any other number of advertising vehicles and/or vehicle types may additionally or alternatively be used. Furthermore, in some instances, the advertisement spending variable may not be granular (e.g., not indicating separate vehicles), but rather represent a total amount that the client 170 anticipates spending in advertising for the media asset.

While sixteen example raw data variables are represented in the example data table 300 of FIG. 3, more or fewer raw data variables may be represented in the example data table 300 corresponding to the many raw audience measurement data variables that may be collected and/or provided by the audience measurement system(s) 105 of FIG. 1 and/or the client 170 of FIG. 1.

Figure 4:
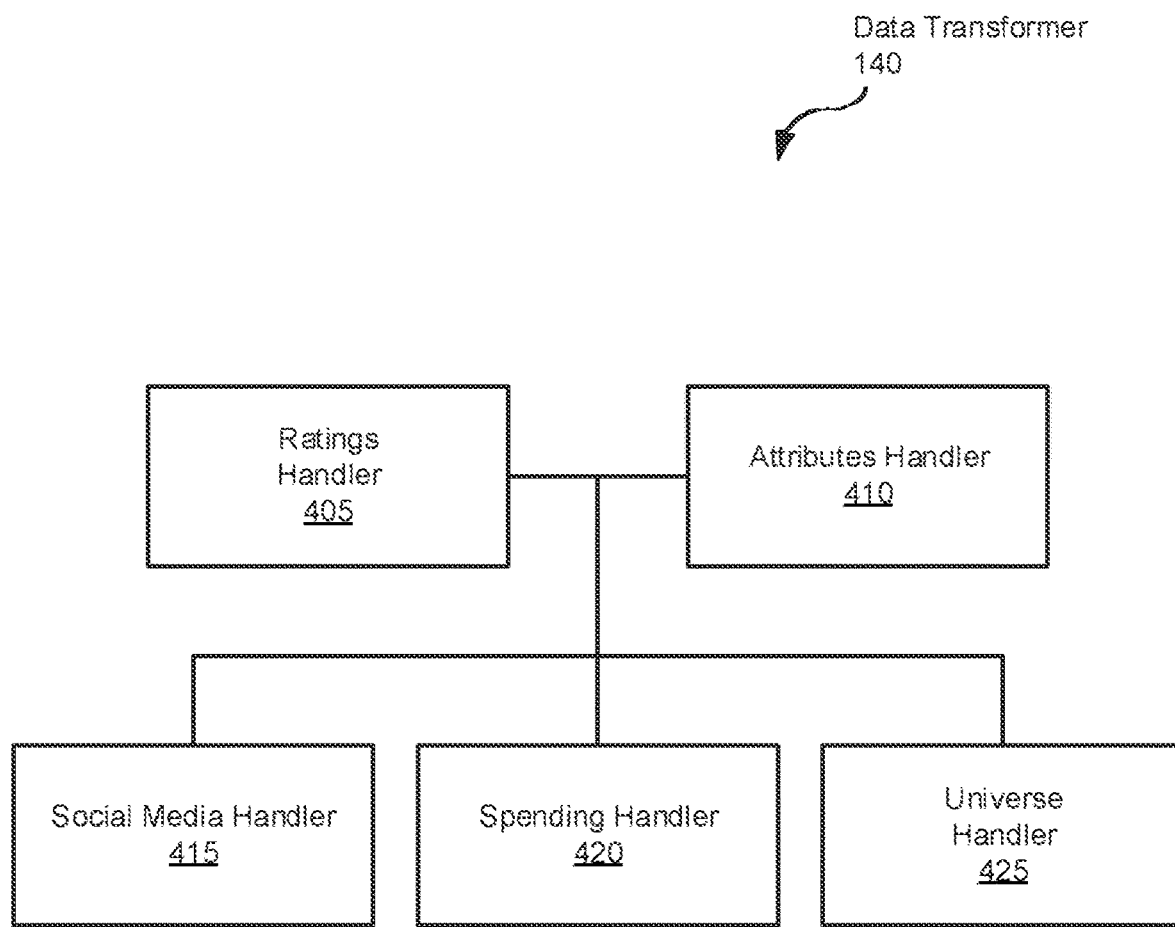
FIG. 4 is an example block diagram of an example implementation of the data transformer of FIG. 1.

FIG. 4 is a block diagram of an example implementation of the data transformer 140 of FIG. 1 that may facilitate manipulating and/or modifying raw audience measurement data 110 retrieved from the example raw data database 135. As described above, the example data transformer 140 transforms the raw information stored in the example raw data database 135 to a form that may be meaningfully handled by the example model builder 150 to generate one or more projection model(s). The example data transformer 140 of FIG. 4 includes an example ratings handler 405, an example attributes handler 410, an example social media handler 415, an example spending handler 420 and an example universe handler 425. In the illustrated example, the ratings handler 405, the attributes handler 410, the social media handler 415, the spending handler 420 and the universe handler 425 record the transformed information in the example predictive features data store 145 of FIG. 1.

In the illustrated example of FIG. 4, the example data transformer 140 includes the example ratings handler 405 to process ratings-related information representative of media assets. For example, the ratings handler 405 may query and/or retrieve ratings-related information from the raw data database 135 (e.g., current ratings information, historical ratings information, etc.) and transform the retrieved ratings-related information into a form meaningfully handled by the example model builder 150 and/or the example future ratings projector 160.

An example data table 500 of the illustrated example of FIG. 5 illustrates example ratings predictive features that may be recorded by the ratings handler 405 in the example predictive features data store 145. The example data table 500 of the illustrated example of FIG. 5 includes a feature name identifier column 505, a feature data type identifier column 510 and a feature meaning identifier column 515. The example feature name identifier column 505 indicates example predictive features that may be associated with a media asset broadcast and/or useful for projecting ratings for future broadcasts of the media asset. The example feature data type identifier column 510 indicates a data type of the corresponding predictive feature. The example feature meaning identifier column 515 provides a brief description of the value associated with the corresponding predictive feature. While three example feature identifier columns are represented in the example data table 500 of FIG. 5, more or fewer feature identifier columns may be represented in the example data table 500.

The example data table 500 of the illustrated example of FIG. 5 includes five example rows corresponding to example ratings-related predictive features. The example first row 550 indicates the ratings handler 405 of FIG. 4 stores the "Hour Ratings" feature as a floating data type. In the illustrated example, the ratings handler 405 determines an "Hour Rating" value based on the "DayTime Ratings" variable retrieved from the example raw data database 135. For example, the ratings handler 405 may query the raw data database 135 for the "DayTime Rating" values starting at a time (e.g., "20:00") and for a day of the week ("e.g., "Tuesday"). In the illustrated example, the ratings handler 405 calculates a rating for the corresponding day and time and records the logarithm transformation of the calculated rating as the "Hour Rating" for an hour-long period starting at the time and day of the week in the example predictive features data store 145.

In the illustrated example, the second example row 555 indicates the ratings handler 405 determines a "Series Ratings" value associated with a media asset of interest based on the "Media Ratings" variable retrieved from the example raw data database 135. For example, the ratings handler 405 may query the raw data database 135 for the "Media Ratings" rating related to a media asset of interest (e.g., "Sports Stuff"). In some examples, the media asset of interest is media included in, for example, the example programming schedule 175 of FIG. 1. In some examples, the media asset of interest may be media identified by the media mapper 137 as related media. In the illustrated example, the ratings handler 405 calculates an average ratings for the media asset of interest based on the historical ratings for the program and records the logarithm transformation of the average ratings as the "Series Ratings" of the media asset of interest in the example predictive features data store 145. However, other techniques for calculating historical ratings for a media asset (e.g., a series) may additionally or alternative be used. For example, the ratings handler 405 may calculate average ratings for media asset on an episode-by-episode basis. For example, the ratings handler 405 may retrieve all historical ratings for the second episode of Quarter 2 and calculate a media ratings value for the second episode of the media asset.

In the illustrated example, the third example row 560 indicates the ratings handler 405 determines a "Genre Rating" value based on the "Media Ratings" variable and the "Genre" variable retrieved from the example raw data database 135. For example, the ratings handler 405 may use the "Genre" variable to query the raw data database 135 for the "Media Rating" values for media assets classified by the genre. In the illustrated example, the ratings handler 405 calculates an average rating for the genre and records the logarithm transformation of the calculated average as the "Genre Rating" in the example predictive features data store 145.

While the example data table 500 of FIG. 5 includes three example historical ratings features, any other number of historical ratings may additionally or alternatively be used.

In the illustrated example of FIG. 4, the example data transformer 140 includes the example attributes handler 510 to process attributes and/or characteristics representative of media assets. For example, the attributes handler 510 may query and/or retrieve program attributes information from the raw data database 135 (e.g., genre-identifying information, day-of-week information, broadcast time-identifying information, etc.) and transform the retrieved program attributes information into a form meaningfully handled by the example model builder 150 and/or the example future ratings projector 160.

An example data table 600 of the illustrated example of FIG. 6 illustrates example program attributes predictive features that may be recorded by the attributes handler 510 in the example predictive features data store 145. The example data table 600 of the illustrated example of FIG. 6 includes a feature name identifier column 605, a feature data type identifier column 610 and a feature meaning identifier column 615. The example feature name identifier column 605 indicates example predictive features that may be associated with a media asset and/or useful for projecting ratings for future broadcasts of the media asset. The example feature data type identifier column 610 indicates a data type of the corresponding predictive feature. The example feature meaning identifier column 615 provides a brief description of the value associated with the corresponding predictive feature. While three example feature identifier columns are represented in the example data table 600 of FIG. 6, more or fewer feature identifier columns may be represented in the example data table 600.

The example data table 600 of the illustrated example of FIG. 6 includes fourteen example rows corresponding to example transformed program attributes predictive features. In the illustrated example, the example program attributes predictive features of the data table 600 represent six example characteristics of a media asset. The first example block of rows 650 indicates that the example attributes handler 410 stores day-of-week information as Boolean features. In the illustrated example, the attributes handler 410 translates day-of-week information that is stored as a string data type at the raw data database 135 to one or more day-of-week Boolean features. For example, the attributes handler 410 may retrieve day-of-week information related to a media asset indicating the date of the week that the media asset is broadcast (e.g., "Tuesday") and set the corresponding day-of-week Boolean feature to true (e.g., "1") and set (or reset) other day-of-week Boolean features to false (e.g., "0"). In the illustrated example, in response to determining that the raw day-of-week information indicates the media asset is broadcast on a "Tuesday," the example attributes handler 410 sets the value of the corresponding "Day Tues" feature to true (e.g., "1") and sets (or resets) the values of the other day-of-week Boolean features (e.g., "Day Mon," . . . "Day SatSun") to false (e.g., "0"). Although the example day-of-week information is represented as six example Boolean features in the example data table 600 of FIG. 6, any other number of Boolean features may additionally or alternatively be used. For example, the attributes handler 410 may group the days-of-week information into a weekday Boolean feature (e.g., the day-of-week is "Monday," "Tuesday," "Wednesday," "Thursday" or "Friday") or a weekend (e.g., the day-of week is "Saturday" or "Sunday") Boolean feature.

The second example block of rows 655 of the data table 600 of FIG. 6 indicates that the example attributes handler 410 stores genre-identifying information as Boolean features. In the illustrated example, the attributes handler 410 translates genre-identifying information that is stored as a string data type at the raw data database 135 to one or more genre-related Boolean features. For example, the attributes handler 410 may retrieve genre-identifying information indicative of the genre classification of a media asset (e.g., a documentary, drama, variety, comedy, etc.) and set the corresponding genre-related Boolean feature to true (e.g., "1") and set (or reset) other genre-related Boolean features to false (e.g., "0"). In the illustrated example, in response to determining that retrieved raw genre-identifying information indicates the corresponding media asset is a "comedy," the example attributes handler 410 sets the value of the corresponding "Genre Comedy" feature to true (e.g., "1") and sets (or resets) the values of the other genre-related Boolean features (e.g., "Genre Documentary," "Genre Drama" and "Genre Variety") to false (e.g., "0"). Although the example genre-identifying information is represented as three example genre-related Boolean features in the example data table 600 of FIG. 6, any other number of Boolean features representative of the genre of a media asset may additionally or alternatively be used.

The third example block of rows 660 of the data table 600 of FIG. 6 indicates that the example attributes handler 410 stores originator-identifying information as Boolean features. In the illustrated example, the attributes handler 410 translates originator-identifying information that is stored as a string data type at the raw data database 135 to one or more originator-related Boolean features. For example, the attributes handler 410 may retrieve originator-identifying information indicative of the network (or channel) that broadcasts a media asset (e.g., channel "ABC," channel "XYZ," etc.) and set the corresponding originator-related Boolean feature to true (e.g., "1") and set (or reset) other originator-related Boolean features to false (e.g., "0"). In the illustrated example, in response to determining that retrieved raw originator-identifying information indicates the corresponding media asset is broadcast on channel "ABC," the example attributes handler 410 sets the value of the corresponding "Originator ABC" feature to true (e.g., "1") and sets (or resets) the values of the other originator-related Boolean features (e.g., "Originator XYZ") to false (e.g., "0"). While two example originators are represented in the example data table 600 of FIG. 6, more or fewer originators may be represented in the example data table 600 corresponding to the many broadcast networks and cable networks that broadcast media assets.

The example row 665 of the data table 600 of FIG. 6 indicates that the example attributes handler 410 stores broadcast time-identifying information as an integer data type. In the illustrated example, the attributes handler 410 maps broadcast time-identifying information that is stored as a string data type at the raw data database 135 to an integer. For example, the attributes handler 410 may retrieve broadcast time-identifying information indicative of when a media asset is broadcast (e.g., "00:00-01:00," "03:00-04:00," . . . "23:00-00:00") and set the "Hour Block" feature value based on a corresponding hour block. For example, the attributes handler 410 may map the broadcast time "00:00-01:00" to half-hour block "0," may map the broadcast time "01:00-02:00" to half-hour block "1," etc. Although the example broadcast time-identifying information is represented as hour blocks, any other granularity may additionally or alternatively be used. For example, the broadcast times may be based on quarter-hours, half-hours, etc.

The fourth example block of rows 660 of the data table 600 of FIG. 6 indicates that the example attributes handler 410 stores media-type identifying information as Boolean features. In the illustrated example, the attributes handler 410 transforms media-type identifying information that is stored as a string data type at the raw data database 135 to one or more media-related Boolean features. For example, the attributes handler 410 may retrieve media-type identifying information indicative of the whether the media asset is a series (e.g., a program that regularly repeats) or a special (e.g., a one-time event such as a movie, a sporting event, a marathon of episodes, etc.) and set the corresponding media-related Boolean feature to true (e.g., "1") and set (or reset) other media-related Boolean features to false (e.g., "0"). In the illustrated example, the media-related Boolean features identify whether the media asset is a series and a premiere, a new or repeat episode of a series, or whether the media asset is a special and a movie or sports event. For example, in response to determining that retrieved raw media-type identifying information indicates the corresponding media asset is series premiere episode, the example attributes handler 410 sets the value of the corresponding "Series Premiere" feature to true (e.g., "1") and sets (or resets) the values of the other media-related Boolean features (e.g., "Series New," "Series Repeat," "Special Movie" or "Special Sports") to false (e.g., "0"). While three example series media-types and two example specials media-types are represented in the example data table 600 of FIG. 6, more or fewer originators may be represented in the example data table 600 corresponding to the many media types of media assets.

While the example data table 600 of FIG. 6 includes five example program attributes related to a media asset (e.g., day-of-week, genre, originator and broadcast time), any other number of program attributes may additionally or alternatively be used.

In the illustrated example of FIG. 4, the example data transformer 140 includes the example social media handler 415 to process social media messages representative of media assets. For example, the social media handler 415 may query and/or retrieve social media messages and/or social media messages-related information from the raw data database 135 (e.g., message identifiers, message timestamps, message content, message authors, etc.) and transform the retrieved social media messages and/or related information into a form meaningfully handled by the example model builder 150 and/or the example future ratings projector 160.

An example data table 700 of the illustrated example of FIG. 7 illustrates example social media data variables transformed into social media predictive features that may be recorded by the social media handler 415 in the example predictive features data store 145. The example data table 700 of the illustrated example of FIG. 7 includes a feature name identifier column 705, a feature data type identifier column 710 and a feature meaning identifier column 715. The example feature name identifier column 705 indicates example predictive features that may be associated with a media asset broadcast and/or useful for projecting ratings for future broadcasts of the media asset. The example feature data type identifier column 710 indicates a data type of the corresponding predictive feature. The example feature meaning identifier column 715 provides a brief description of the value associated with the corresponding predictive feature. While three example feature identifier columns are represented in the example data table 700 of FIG. 7, more or fewer feature identifier columns may be represented in the example data table 700.

The example data table 700 of the illustrated example of FIG. 7 includes two example rows corresponding to example social media predictive features. The first example row 750 indicates the social media handler 415 of FIG. 4 stores an "SM Count" feature as a floating data type in the example predictive features data store 145. In the illustrated example, the social media handler 415 determines the "SM Count" value, or social media count value, associated with a media asset of interest based on a number of posted social media messages of interest. For example, the social media handler 415 may inspect the social media messages returned by the raw data database 135 for social media messages that indicate exposure to a media asset. For example, a media asset may be "Sports Stuff" In such an example, a social media message of interest may include the text "Jon is my favorite character on Sports Stuff!" and may include a message timestamp indicating that the social media message was posted by the message author during broadcast of the media asset. In the illustrated example, the social media handler 415 may count the number of social media messages identified as of interest and record a logarithm transformation of the number of social media messages of interest (e.g., the social media messages that indicate exposure to a media asset) as the "SM Count" corresponding to the media asset of interest in the example predictive features data store 145.

The second example row 755 of the data table 700 of FIG. 7 indicates that the example social media handler 415 stores a value related to the number of unique authors who posted social media messages of interest as a floating data type in the example predictive features data store 145. The second example row 755 of the data table 700 of FIG. 7 indicates the social media handler 415 of FIG. 4 stores a "SM UAuthors" feature as a floating data type in the example translated data database 145. In the illustrated example, the social media handler 415 determines the "SM UAuthors" value, or social media unique authors value, associated with a media asset of interest based on a number of unique authors who posted social media messages of interest. For example, the social media handler 415 may inspect the social media messages returned by the raw data database 135 for social media messages that indicate exposure to a media asset. In the illustrated example, the social media handler 415 may count the number of unique authors who posted the social media messages identified as of interest and record a logarithm transformation of the number of unique authors as the "SM UAuthors" corresponding to the media asset of interest in the example translated data database 145.

In the illustrated example, the example social media handler 415 inspects social media messages and/or social media messages-related information retrieved from the raw data database 135 and transform(s) the retrieved social media messages and/or related information into a form meaningfully handled by the example model builder 150 and/or the example future ratings projector 160. In some examples, the raw audience measurement data 110 may be provided as aggregated data. For example, rather than providing social media messages and/or social media messages-related information, the example audience measurement system(s) 105 of FIG. 1 may count the number of posted social media messages related to media assets of interest, may count the number of unique authors who posted social media messages related to media assets of interest, etc., and provide the respective counts to the example central facility 125. In some such examples, the example social media handler 415 may retrieve the respective counts and store the logarithm transformation of the corresponding numbers as the respective social media-related predictive features. However, any other technique may be used to determine the number of posted social media messages related to media assets of interest and/or the number of unique authors who posted social media messages related to media assets of interest.

While the example data table 700 of FIG. 7 includes two example social media features, any other number of social media indicators may additionally or alternatively be used. For example, the example data table 700 may include a count of the number of impressions associated with posted social media messages related to media assets of interest.

In the illustrated example of FIG. 4, the example data transformer 140 includes the example spending handler 420 to process spending-related information representative of media assets. For example, the spending handler 420 may query and/or retrieve advertisement-spending variables from the raw data database 135 and transform the retrieved advertisement-spending variables into a form meaningfully handled by the example model builder 150 and/or the example future ratings projector 160.

An example data table 800 of the illustrated example of FIG. 8 illustrates example advertisement-spending variables transformed into spending predictive features that may be recorded by the spending handler 420 in the example predictive features data store 145. The example data table 800 of the illustrated example of FIG. 8 includes a feature name identifier column 805, a feature data type identifier column 810 and a feature meaning identifier column 815. The example feature name identifier column 805 indicates example predictive features that may be associated with a media asset broadcast and/or useful for projecting ratings for future broadcasts of the media asset. The example feature data type identifier column 810 indicates a data type of the corresponding predictive feature. The example feature meaning identifier column 815 provides a brief description of the value associated with the corresponding predictive feature. While three example feature identifier columns are represented in the example data table 800 of FIG. 8, more or fewer feature identifier columns may be represented in the example data table 800.

The first example block of rows 855 indicates that the example spending handler 420 stores advertisement-spending related information as floating data types in the predictive features data store 145. In the illustrated example, the spending handler 420 retrieves the respective amounts and store the logarithm transformation of the corresponding amounts as the respective advertisement-spending features. However, any other technique may be used to determine the amount of advertisement spending anticipated for the different advertisement vehicles. While the example data table 800 of FIG. 8 includes seven example vehicles for advertisement spending, any other number of advertisement vehicles may additionally or alternatively be used.

In the illustrated example, the example row 865 indicates that spending handler 420 determines a "Total Ad Spending" value based on the different advertisement vehicles retrieved from the example raw data database 135 (e.g., the fourth example block of rows 375 of FIG. 3). For example, the spending handler 420 may retrieve each of the different advertisement spending variables from the raw data database 135 and sum the total amount anticipated to be spent on advertisements for the corresponding media asset of interest. In the illustrated example, the spending handler 420 records the logarithm transformation of the calculated total amount as the "Total Ad Spending" feature in the example predictive features data store 145 as a floating data type.

In the illustrated example of FIG. 4, the example data transformer 140 includes the example universe handler 425 to process universe estimates-related information representative of populations for different demographic groupings. For example, the universe handler 450 may query and/or retrieve population estimates from the raw data database 135 and transform the retrieved population estimates into a form meaningfully handled by the example model builder 150 and/or the example future ratings projector 160.

An example data table 900 of the illustrated example of FIG. 9 illustrates example population estimates variables transformed into universe estimate features that may be recorded by the universe handler 425 in the example predictive features data store 145. The example data table 900 of the illustrated example of FIG. 9 includes a feature name identifier column 905, a feature data type identifier column 910 and a feature meaning identifier column 915. The example feature name identifier column 905 indicates example predictive features that may be associated with a universe. The example feature data type identifier column 910 indicates a data type of the corresponding predictive feature. The example feature meaning identifier column 915 provides a brief description of the value associated with the corresponding predictive feature. While three example feature identifier columns are represented in the example data table 900 of FIG. 9, more or fewer feature identifier columns may be represented in the example data table 900.

The example block of rows 950 of the example data table 900 indicates that the example universe handler 425 stores universe estimates as floating data types in the predictive features data store 145. In the illustrated example, the universe handler 425 retrieves the respective universe counts and stores the logarithm transformation of the corresponding amounts as the respective universe estimate features. However, any other technique may be used to determine the estimated number of actual households or people from which a sample is taken and to which data from the sample will be projected. While the example data table 900 of FIG. 9 includes universe estimates for twelve example demographic groupings, any other number of demographic groupings may additionally or alternatively be used.

In the illustrated example, the example row 955 indicates that the universe handler 425 determines a "Total Households" value based on the different demographic groupings retrieved from the example raw data database 135. For example, the universe handler 425 may retrieve each of the different universe estimate variables from the raw data database 135 and sum the total amount households or persons in the corresponding demographic groupings. In the illustrated example, the universe handler 425 records the logarithm transformation of the calculated total of households or persons as the "Total Households" feature in the example predictive features data store 145 as a floating data type.

While an example manner of implementing the central facility 125 of FIG. 1 is illustrated in FIG. 1, one or more of the elements, processes and/or devices illustrated in FIG. 1 may be combined, divided, re-arranged, omitted, eliminated and/or implemented in any other way. Further, the example data interface 130, the example raw data database 135, the example media mapper 137, the example media catalog 139, the example data transformer 140, the example predictive features data store 145, the example model builder 150, the example models database 155, the example future ratings projector 160 and/or, more generally, the example central facility 125 of FIG. 1 may be implemented by hardware, software, firmware and/or any combination of hardware, software and/or firmware. Thus, for example, any of the example data interface 130, the example raw data database 135, the example media mapper 137, the example media catalog 139, the example data transformer 140, the example predictive features data store 145, the example model builder 150, the example models database 155, the example future ratings projector 160 and/or, more generally, the example central facility 125 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 130, the example raw data database 135, the example media mapper 137, the example media catalog 139, the example data transformer 140, the example predictive features data store 145, the example model builder 150, the example models database 155, the example future ratings projector 160 and/or, more generally, the example central facility 125 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 125 of FIG. 1 may include one or more elements, processes and/or devices in addition to, or instead of, those illustrated in FIG. 1, and/or may include more than one of any or all of the illustrated elements, processes and devices.

While an example manner of implementing the data transformer 140 of FIG. 1 is illustrated in FIG. 4, one or more of the elements, processes and/or devices illustrated in FIG. 4 may be combined, divided, re-arranged, omitted, eliminated and/or implemented in any other way. Further, the example ratings handler 405, the example attributes handler 410, the example social media handler 415, the example spending handler 420, the example universe handler 425 and/or, more generally, the example data transformer 140 of FIG. 4 may be implemented by hardware, software, firmware and/or any combination of hardware, software and/or firmware. Thus, for example, any of the example ratings handler 405, the example attributes handler 410, the example social media handler 415, the example spending handler 420, the example universe handler 425 and/or, more generally, the example data transformer 140 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ratings handler 405, the example attributes handler 410, the example social media handler 415, the example spending handler 420, the example universe handler 425 and/or, more generally, the example data transformer 140 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example data transformer 140 of FIG. 1 may include one or more elements, processes and/or devices in addition to, or instead of, those illustrated in FIG. 4, and/or may include more than one of any or all of the illustrated elements, processes and devices.

Flowcharts representative of example machine readable instructions for implementing the example central facility of FIG. 1 are shown in FIGS. 10-16 and/or 17. In these examples, the machine readable instructions comprise a program for execution by a processor such as the processor 1912 shown in the example processor platform 1900 discussed below in connection with FIG. 19. The program may be embodied in software stored on a tangible computer readable storage medium such as a CD-ROM, a floppy disk, a hard drive, a digital versatile disk (DVD), a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 10-16 and/or 17, many other methods of implementing the example central facility 125 may alternatively be used. For example, the order of execution of the blocks may be changed, and/or some of the blocks described may be changed, eliminated, or combined.

As mentioned above, the example processes of FIGS. 10-16 and/or 17 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10-16 and/or 17 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

Figure 10:
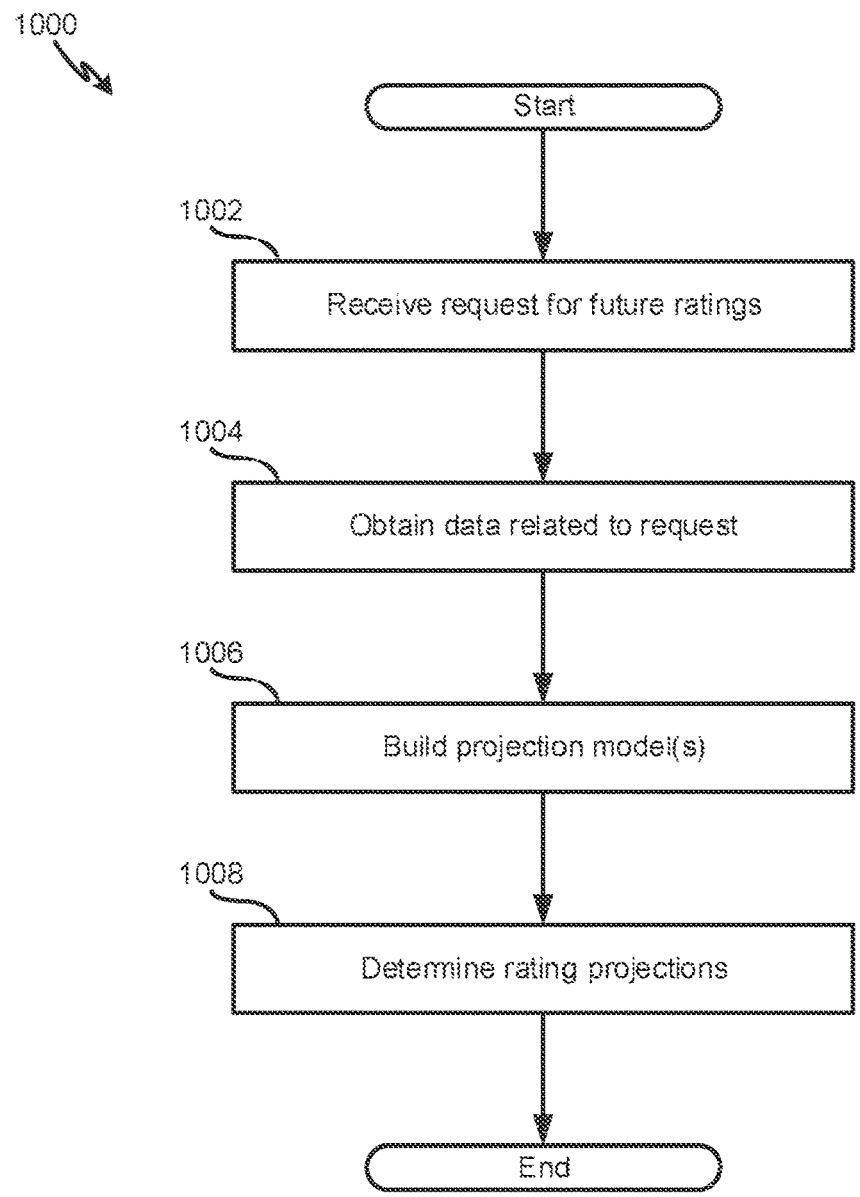
FIG. 10 is a flowchart representative of example machine-readable instructions that may be executed by the example central facility of FIG. 1 to project ratings for future broadcasts of media.

FIG. 10 is a flowchart representative of example machine-readable instructions 1000 that may be executed by the example central facility 125 of FIG. 1 to project ratings for future broadcasts of media. The example instructions 1000 of FIG. 10 begin at block 1002 when the example central facility 125 receives a request for ratings projections for a future broadcast of media. For example, the client 170 may request the AME 120 project ratings for the example programming schedule 200 of FIG. 2. The request may be to project ratings for a near-term quarter (e.g., a quarter that is one or two quarters in the future) or a request to project ratings for an upfront quarter (e.g., a quarter that is three or more quarters in the future).

At block 1004, the example central facility 125 obtains data related to the request. For example, the central facility 125 may parse the raw data database 135 (FIG. 1) to obtain data for building one or more projection model(s). In some examples, the example media mapper 137 (FIG. 1) may identify media related to media assets included in the programming schedule 200. In some examples, the example data transformer 140 (FIGS. 1 and/or 4) may transform raw data stored in the raw data database 135 into a form meaningfully handled by the example model builder 150 (FIG. 1) and/or the example future ratings projector 160 (FIG. 1).

At block 1006, the example central facility 125 builds one or more projection model(s). For example, the model builder 150 may determine a relationship between predictive features stored in the predictive features data store 145 (FIG. 1) and historical ratings. The example model builder 150 stores the generated model(s) in the example models data store 155 (FIG. 1). An example approach to build a projection model is described below in connection with FIG. 17.

At block 1008, the example central facility 125 determines projected ratings for future broadcasts of media. For example, the example future ratings projector 160 may apply data related to a media asset of interest to a projection model to estimate ratings for a media asset based on the programming schedule 200. An example approach to estimate ratings for future broadcasts of media is described below in connection with FIG. 18. The example process 1000 of FIG. 10 ends.

While in the illustrated example, the example instructions 1000 of FIG. 10 represent a single iteration of projecting ratings for future broadcasts of media, in practice, the example instructions 1000 of the illustrated example of FIG. 10 may be executed in parallel (e.g., in separate threads) to allow the central facility 125 to handle multiple requests for ratings projections at a time.

Figure 11:
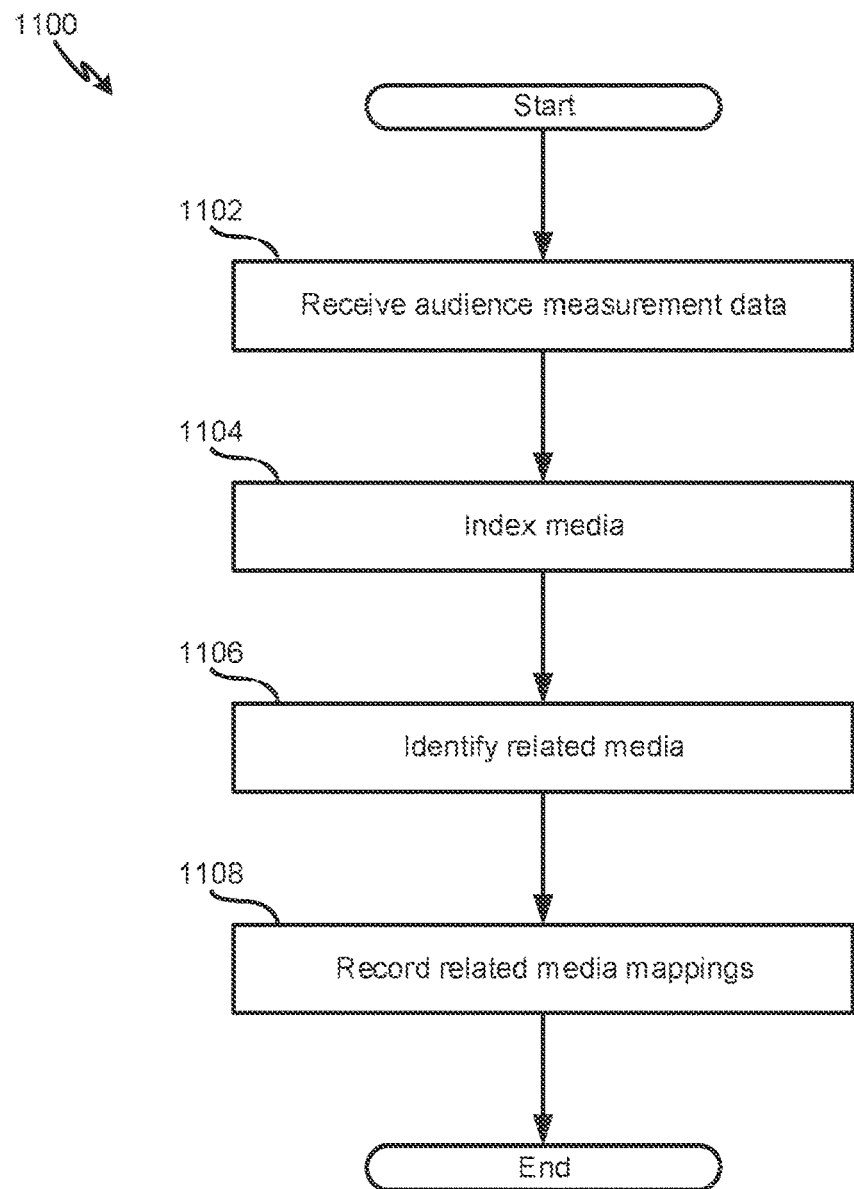
FIG. 11 is a flowchart representative of example machine-readable instructions that may be executed by the example media mapper of FIG. to catalog related media. [0015]

FIG. 11 is a flowchart representative of example machine-readable instructions 1100 that may be executed by the example central facility 125 of FIG. 1 to catalog related media. The example instructions 1100 of FIG. 11 begin at block 1102 when the example central facility 125 receives audience measurement data 110 from the example audience measurement system(s) 105 of FIG. 1. For example, the example data interface 130 (FIG. 1) may obtain and/or retrieve example panelist media measurement data 110A and/or example social media activity data 110B periodically and/or based on one or more events. In some examples, the data interface 130 may obtain and/or receive an example programming schedule 175 from the example client 170 periodically and/or based on one or more events. In some examples, the data interface 130 may obtain, retrieve and/or receive the example audience measurement data 110 and/or the programming schedule 175 aperiodically and/or as a one-time event. The example data interface 130 stores the audience measurement data 110 in the example raw data database 135 (FIG. 1).

At block 1104, the example central facility 125 indexes the audience measurement data 110. For example, the example media mapper 137 (FIG. 1) may parse the raw data database 135 and identify media identifiers associated with different media assets. At block 1106, the example media mapper 137 identifies related media. For example, the media mapper 137 may identify related media by comparing program names. In some examples, the media mapper 137 may identify related media by processing the program names for typographical errors (e.g., common typographical errors). In some examples, the media mapper 137 utilizes title names, broadcast day and times, media director(s), character name(s), actor and actress name(s), etc., to identify related media.

At block 1108, the example media mapper 137 records the media mappings. For example, the media mapper 137 may map a first media asset (e.g., a first media asset name) to a second media asset (e.g., a second media name) and store the media mapping in the example media catalog 139 (FIG. 1). The example process 1100 of FIG. 11 then ends.

Figure 12:
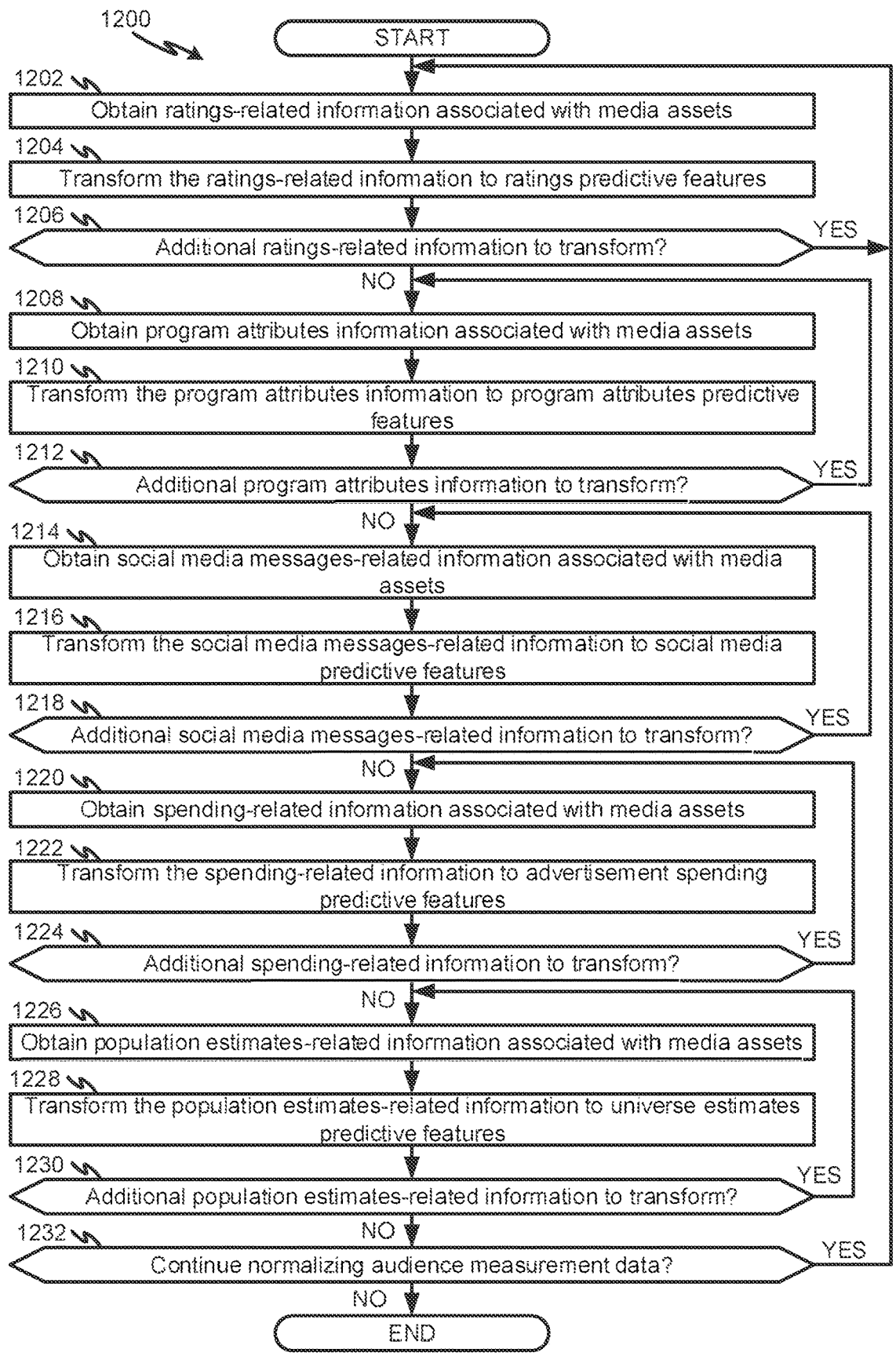
FIG. 12 is a flowchart representative of example machine-readable instructions that may be executed by the example data transformer of FIGS. 1 and/or 4 to transform raw audience measurement data to predictive features.

FIG. 12 is a flowchart representative of example machine-readable instructions 1200 that may be executed by the example data transformer 140 of FIGS. 1 and/or 4 to transform raw audience measurement data to predictive features. The example process 1200 of the illustrated example of FIG. 12 begins at block 1202 when the example data transformer 140 obtains ratings-related information associated with media assets. For example, the data transformer 140 may retrieve and/or query "media" ratings, "DayTime" ratings and/or information representative of whether a panelist viewed a particular episode of a media asset from the example raw data database 135. At block 1204, the example ratings handler 405 (FIG. 4) transforms the ratings-related information to ratings predictive features for use by the example model builder 150 and/or the example future ratings projector 160. In the illustrated example, the ratings handler 405 transforms the ratings-related information in accordance with the example ratings predictive features table 500 of FIG. 5. At block 1206, the example ratings handler 405 determines whether there is additional ratings-related information to transform. If, at block 1206, the ratings handler 405 determined that there is additional ratings-related information to transform, control returns to block 1202.

If, at block 1206, the ratings handler 405 determined that there is not additional ratings-related information to transform, then, at block 1208, the example data transformer 140 obtains program attributes information associated with media assets. For example, the example attributes handler 410 (FIG. 4) may retrieve and/or query the example raw data database 135 for day-of-week information, genre information, network information and/or broadcast time information. At block 1210, the example attributes handler 410 transforms the program attributes information to program attributes predictive features for use by the example model builder 150 and/or the example future ratings projector 160. In the illustrated example, the attributes handler 410 transforms the program attributes information in accordance with the example program attributes predictive features table 600 of FIG. 6. At block 1212, the example attributes handler 410 determines whether there is additional program attributes information to transform. If, at block 1212, the attributes handler 410 determined that there is additional program attributes information to transform, control returns to block 1208.

If, at block 1212, the attributes handler 410 determined that there is not additional program attributes information to transform, then, at block 1214, the example data transformer 140 obtains social media messages-related information associated with media assets. For example, the example social media handler 415 may retrieve and/or query the example raw data database 135 for a number of posted social media messages of interest and/or a number of unique authors who posted social media messages of interest. At block 1216, the example social media handler 415 transforms the social media messages-related information to social media predictive features for use by the example model builder 150 and/or the example future ratings projector 160. In the illustrated example, the social media handler 415 transforms the social media messages-related information in accordance with the example social media predictive features table 700 of FIG. 7. At block 1218, the example social media handler 415 determines whether there is additional social media messages-related information to transform. If, at block 1218, the social media handler 415 determined that there is additional social media messages-related information to transform, control returns to block 1214.

If, at block 1218, the social media handler 415 determined that there is not additional social media information to transform, then, at block 1220, the example data transformer 140 obtains spending-related information associated with media assets. For example, the example spending handler 420 may retrieve and/or query the example raw data database 135 for anticipated amounts (e.g., in money or resources) associated with different advertising vehicles. At block 1222, the example spending handler 420 transforms the spending-related information to advertisement spending predictive features for use by the example model builder 150 and/or the example future ratings projector 160. In the illustrated example, the spending handler 420 transforms the spending-related information in accordance with the example advertisement spending predictive features table 800 of FIG. 8. At block 1224, the example spending handler 420 determines whether there is additional spending-related information to transform. If, at block 1224, the spending handler 420 determined that there is additional spending-related information to transform, control returns to block 1220.

If, at block 1224, the spending handler 420 determined that there is not additional spending-related information to transform, then, at block 1226, the example data transformer 140 obtains universe-estimates information associated with media assets. For example, the example universe handler 425 may retrieve and/or query the example raw data database 135 for the number of households and/or people associated with different demographic groupings. At block 1228, the example universe handler 425 transforms the universe estimates-related information to universe estimates predictive features for use by the example model builder 150 and/or the example future ratings projector 160. In the illustrated example, the universe handler 425 transforms the universe estimates-related information in accordance with the example universe estimates predictive features table 900 of FIG. 9. At block 1230, the example universe handler 425 determines whether there is additional universe estimates-related information to transform. If, at block 1230, the universe handler 425 determined that there is additional universe estimates-related information to transform, control returns to block 1226.

If, at block 1230, the universe handler 425 determined that there is not additional population estimates-related information to transform, then, at block 1232, the example data transformer 140 determines whether to continue normalizing audience measurement data. If, at block 1232, the example data transformer 140 determined to continue normalizing audience measurement data, control returns to block 1202 to wait to obtain ratings-related information for translating.

If, at block 1232, the example data transformer 140 determined not to continue normalizing audience measurement data, the example process 1200 of FIG. 12 ends.

While in the illustrated example, the example instructions 1200 of FIG. 12 represent a single iteration of normalizing audience measurement data, in practice, the example instructions 1200 of the illustrated example of FIG. 12 may be executed in parallel (e.g., in separate threads) to allow the central facility 125 to handle multiple requests for normalizing audience measurement data at a time.

Figure 13:
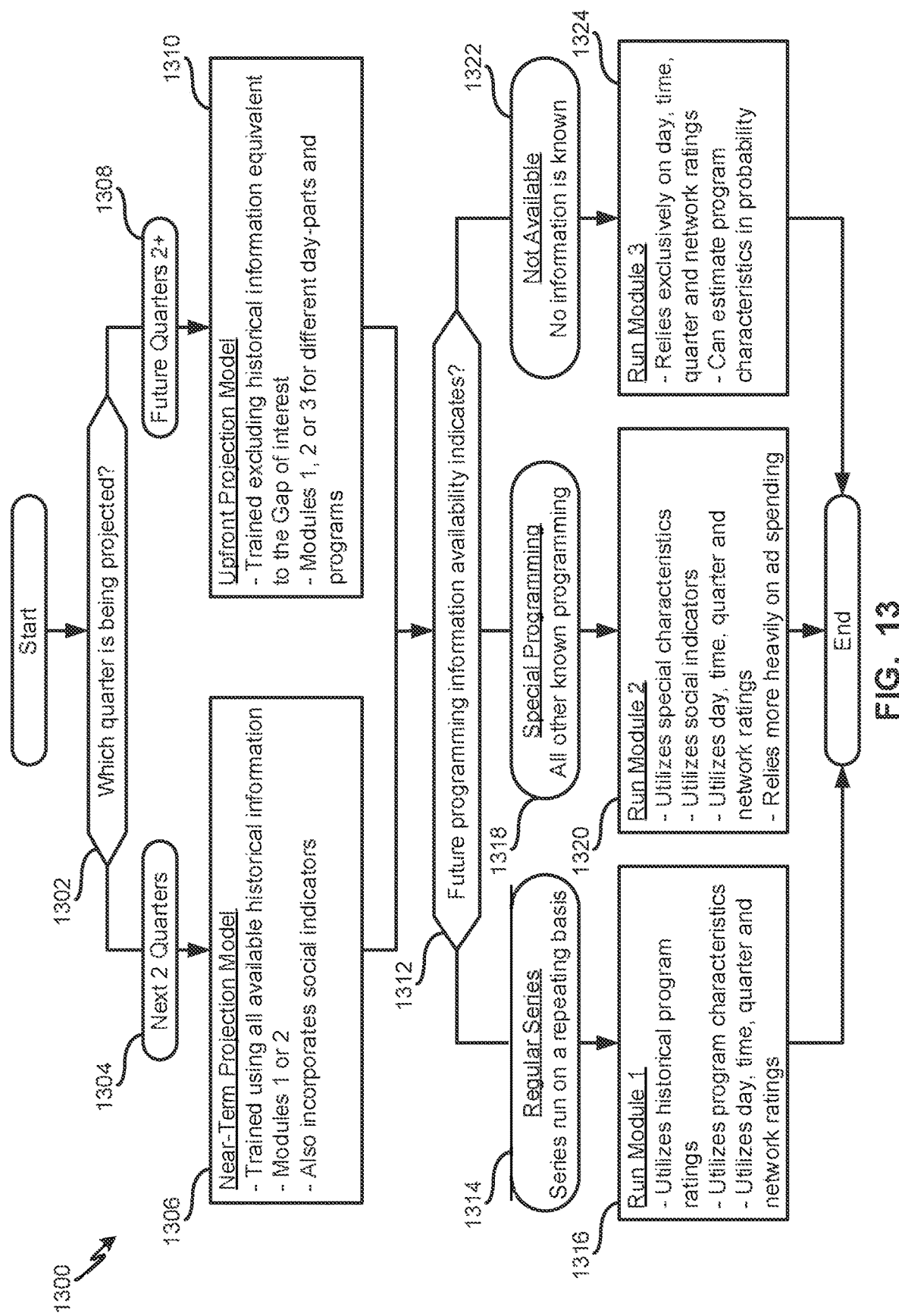
FIG. 13 is a flowchart representative of example machine-readable instructions that may be executed by the example central facility of FIG. 1 to project ratings for future broadcasts of media.

FIG. 13 is a flowchart representative of example machine-readable instructions 1300 that may be executed by the example central facility 125 of FIG. 1 to project ratings for future broadcasts of a media asset. The example process 1300 of the illustrated example of FIG. 13 begins at block 1302 when the example central facility 125 determines the quarter of interest. If, at block 1302, the central facility 125 determined that the quarter of interest is within the next two quarters (block 1304), then, at block 1306, the central facility 125 determines to build a near-term projection model.

If, at block 1302, the central facility 125 determined that the quarter of interest is more than two quarters (e.g., three or more quarters) from the current quarter (block 1308), then, at block 1310, the central facility 125 determines to build an upfront projection model.

At block 1312, the central facility 125 determines the amount of future programming information that is available and classifies the media asset accordingly. For example, if, at block 1312, the central facility 125 determined that a media asset of interest is a television series (e.g., a regular series) (block 1314), then, at block 1316, the central facility 125 applies predictive features associated with a first module (Module 1) when building the projection model and predicting the future ratings for the media asset of interest. Example predictive features associated with Module 1 are illustrated in example schema 1400 of FIG. 14. The example process 1300 of FIG. 13 ends.

If, at block 1312, the central facility 125 determined that a media asset of interest is special programming (block 1318), then, at block 1320, the central facility 125 applies predictive features associated with a second module (Module 2) when building the projection model and predicting the future ratings for the media asset of interest. Example predictive features associated with Module 2 are illustrated in example schema 1500 of FIG. 15. The example process 1300 of FIG. 13 ends.

If, at block 1312, the central facility 125 determined that no future programming information is available for the media asset of intersect (block 1322), then, at block 1324, the central facility 125 applies predictive features associated with a third module (Module 3) when building the projection model and predicting the future ratings for the media asset of interest. Example predictive features associated with Module 3 are illustrated in example schema 1600 of FIG. 16. The example process 1300 of FIG. 13 ends.

Figure 14:
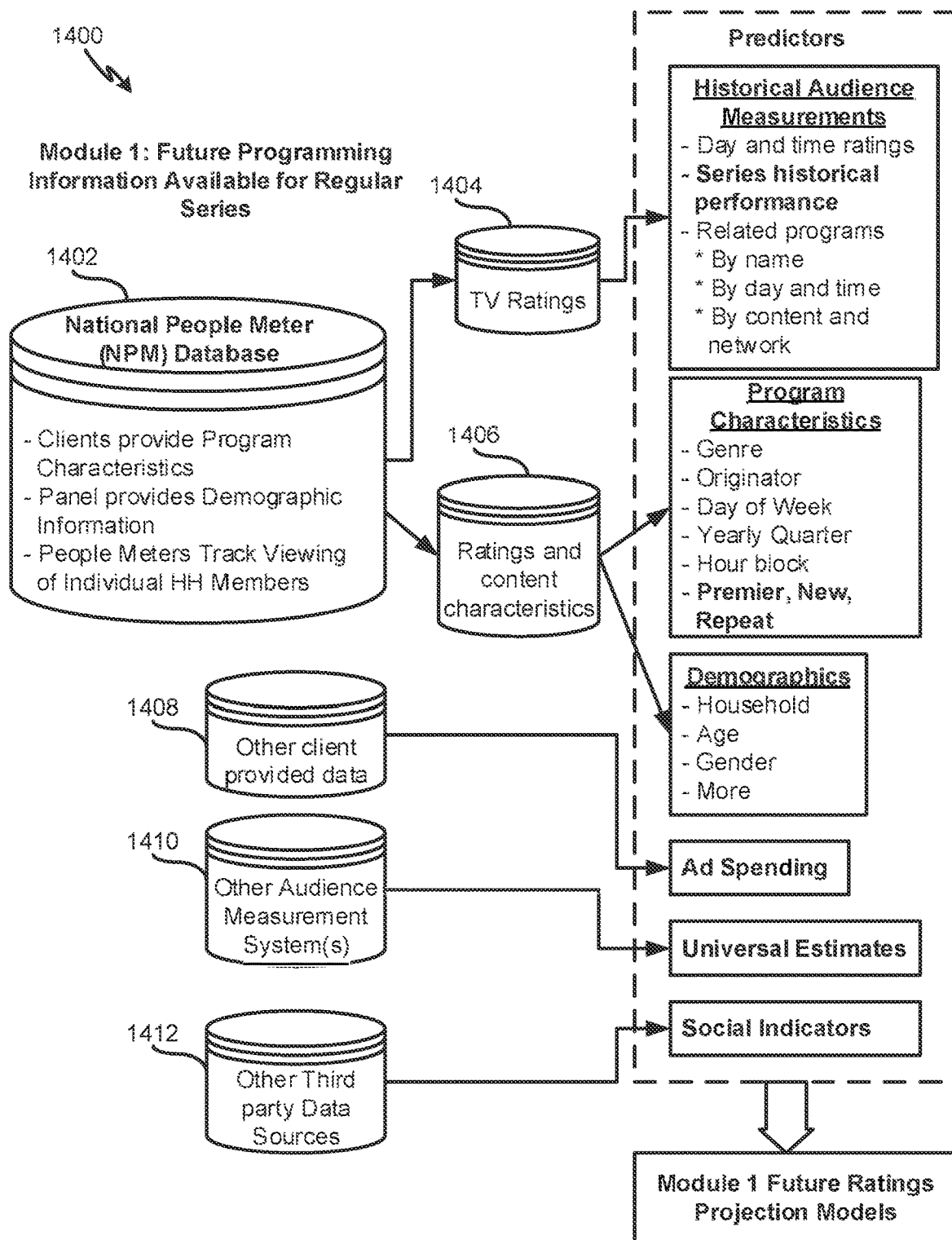
FIG. 14 is an example schema that may be used by the example central facility of FIG. 1 to determine predictive features associated with a first module.

An example schema 1400 of the illustrated example of FIG. 14 illustrates example sets of predictive features that are used when generating projection models and/or that are applied to a projection model when projecting ratings of future broadcasts for television series (Module 1). The example schema 1400 indicates that audience measurement data 110 may be obtained and/or retrieved from a National People Meter (NPM) database 1402, which includes, but is not limited to, client-provided program characteristics, panelist-provided demographic information and viewing behaviors of individual households (HH) via people meters. In the illustrated example, the data provided by the NPM database 1402 may include TV ratings information 1404 and ratings and content characteristics information 1406. In the illustrated example of FIG. 14, the TV ratings information 1404 includes historical audience measurements, such as, but not limited to, day and time ratings, series historical performance and corresponding information for related programs (e.g., programs related by name, day and time and/or content and network).

In the illustrated example of FIG. 14, the ratings and content characteristics information 1406 includes program characteristics (e.g., genre, originator, day of week, yearly quarter, hour block, etc.). The example ratings and content characteristics information 1406 of FIG. 14 also includes an indication of whether a media asset is a premier episode, a new episode or a repeat episode. The example ratings and content characteristics information 1406 also includes demographic information such as household, age, gender, etc.

The example schema 1400 of FIG. 14 also includes other client-provided information 1408 (e.g., advertisement spending), other audience measurement system(s) information 1410 (e.g., universal estimates) and other third party information 1412 (e.g., social media indicators).

In the illustrated example, the schema 1400 indicates that the information provided by the data sources 1402, 1404, 1406, 1408, 1410, 1412 is processed (e.g., transformed) into predictors (e.g., predictive features). The predictors may be used by the central facility 125 of FIG. 1 to generate projection models and/or to project ratings of future broadcasts for television series (Module 1).

Figure 15:
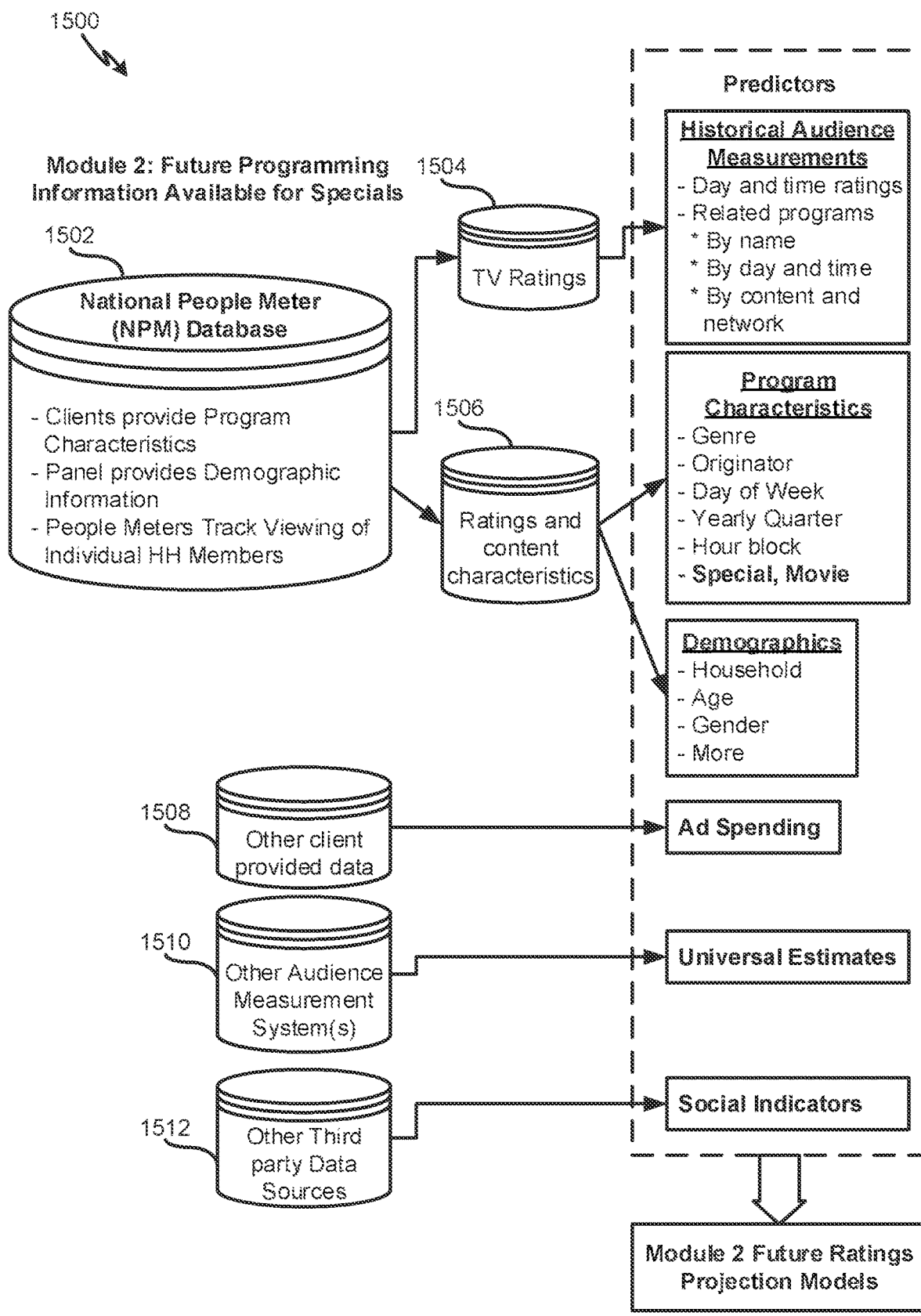
FIG. 15 is an example schema that may be used by the example central facility of FIG. 1 to determine predictive features associated with a second module.

An example schema 1500 of the illustrated example of FIG. 15 illustrates example sets of predictive features that are used when generating projection models and/or that are applied to a projection model when projecting ratings of future broadcasts for special programming (Module 2). The example schema 1500 indicates that audience measurement data 110 may be obtained and/or retrieved from a National People Meter (NPM) database 1502, which includes, but is not limited to, client-provided program characteristics, panelist-provided demographic information and viewing behaviors of individual households (HH) via people meters. In the illustrated example, the data provided by the NPM database 1502 may include TV ratings information 1504 and ratings and content characteristics information 1506. In the illustrated example of FIG. 15, the TV ratings information 1504 includes historical audience measurements, such as, but not limited to, day and time ratings associated with a media asset and corresponding information for related programs (e.g., programs related by name, day and time and/or content and network).

In the illustrated example of FIG. 15, the ratings and content characteristics information 1506 includes program characteristics (e.g., genre, originator, day of week, yearly quarter, hour block, etc.). The example ratings and content characteristics information 1506 of FIG. 15 also includes an indication of whether a media asset is a special, a movie, etc. The example ratings and content characteristics information 1606 of FIG. 16 also includes an indication of whether a media asset is a premier episode, a new episode or a repeat episode. The example ratings and content characteristics information 1606 also includes demographic information such as household, age, gender, etc.

The example schema 1500 of FIG. 15 also includes other client-provided information 1508 (e.g., advertisement spending), other audience measurement system(s) information 1510 (e.g., universal estimates) and other third party information 1512 (e.g., social media indicators).

In the illustrated example, the schema 1500 indicates that the information provided by the data sources 1502, 1504, 1506, 1508, 1510, 1512 is processed (e.g., transformed) into predictors (e.g., predictive features). The predictors may be used by the central facility 125 of FIG. 1 to generate projection models and/or to project ratings of future broadcasts for special programming (Module 2).

Figure 16:
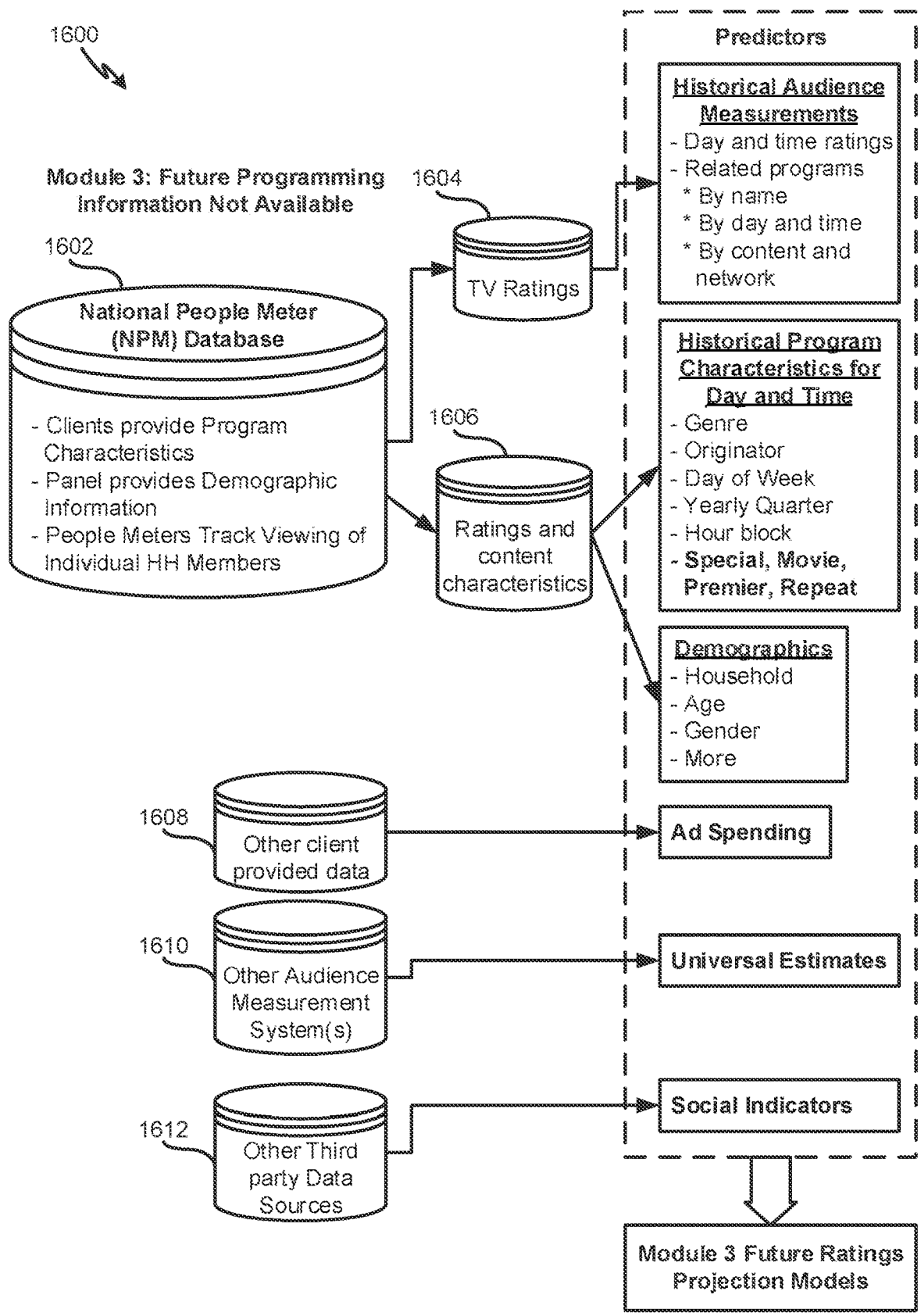
FIG. 16 is an example schema that may be used by the example central facility of FIG. 1 to determine predictive features associated with a third module.

An example schema 1600 of the illustrated example of FIG. 16 illustrates example sets of predictive features that are used when generating projection models and/or that are applied to a projection model when projecting ratings of future broadcasts for media with unknown future programming information (Module 3). The example schema 1600 indicates that audience measurement data 110 may be obtained and/or retrieved from a National People Meter (NPM) database 1602, which includes, but is not limited to, client-provided program characteristics, panelist-provided demographic information and viewing behaviors of individual households (HH) via people meters. In the illustrated example, the data provided by the NPM database 1602 may include TV ratings information 1604 and ratings and content characteristics information 1606. In the illustrated example of FIG. 16, the TV ratings information 1604 includes historical audience measurements, such as, but not limited to, day and time ratings associated with a media asset and corresponding information for related programs (e.g., programs related by name, day and time and/or content and network).

In the illustrated example of FIG. 16, the ratings and content characteristics information 1606 includes program characteristics (e.g., genre, originator, day of week, yearly quarter, hour block, etc.). The example ratings and content characteristics information 1606 of FIG. 16 also includes an indication of whether a media asset is a special, a movie, a premiere episode, a repeat episode, a new episode, etc. The example ratings and content characteristics information 1606 of FIG. 16 also includes an indication of whether a media asset is a premier episode, a new episode or a repeat episode. The example ratings and content characteristics information 1606 also includes demographic information such as household, age, gender, etc.

The example schema 1600 of FIG. 16 also includes other client-provided information 1608 (e.g., advertisement spending), other audience measurement system(s) information 1610 (e.g., universal estimates) and other third party information 1612 (e.g., social media indicators).

In the illustrated example, the schema 1600 indicates that the information provided by the data sources 1602, 1604, 1606, 1608, 1610, 1612 is processed (e.g., transformed) into predictors (e.g., predictive features). The predictors may be used by the central facility 125 of FIG. 1 to generate projection models and/or to project ratings of future broadcasts for media assets with unknown future programming information (Module 3).

Figure 17:
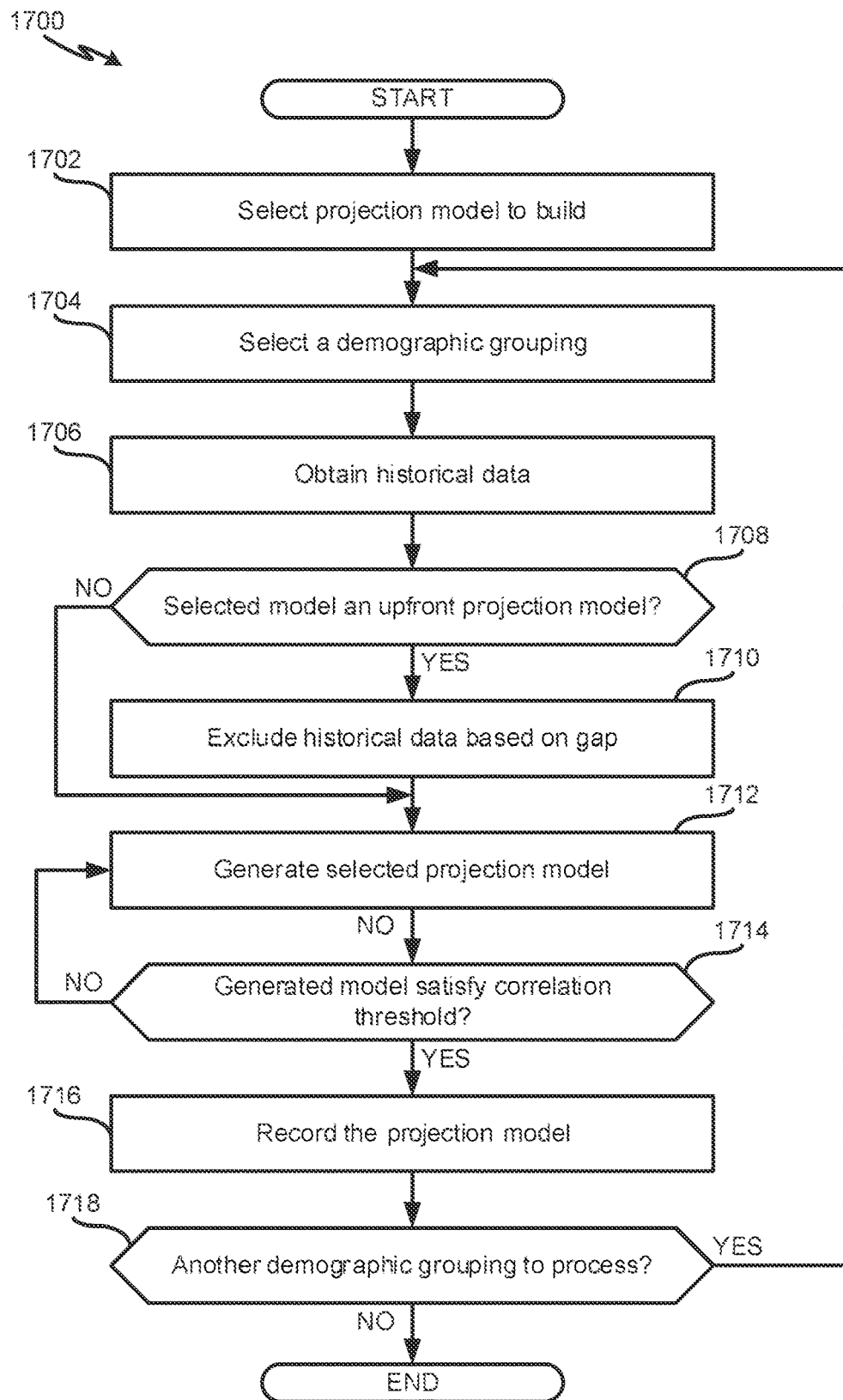
FIG. 17 is a flowchart representative of example machine-readable instructions that may be executed by the example model builder of FIG. 1 to project ratings for future broadcasts of media.

FIG. 17 is a flowchart representative of example machine-readable instructions 1700 that may be executed by the example model builder 150 of FIG. 1 to build a ratings projection model. The example process 1700 of the illustrated example of FIG. 17 begins at block 1702 when the example model builder 150 selects a projection model to build based on the quarter of interest. For example, the model builder 150 may select an upfront projection model when the quarter of interest is three or more quarters in the future and select the near-term projection model when the quarter of interest is one or two quarters in the future.

At block 1704, the example model builder 150 selects a demographic grouping associated with the projection model. For example, the model builder 150 may generate a plurality of projection models corresponding to different demographic segments.

At block 1706, the example model builder 150 obtains historical data stored in the example predictive features data store 145 (FIG. 1) based on the quarter of interest and the selected demographic segment. In the illustrated example, the model builder 150 obtains historical data from the predictive features data store 145 corresponding to the eight previous quarters from the quarter of interest. For example, if the quarter of interest is the first quarter of 2016, then the model builder 150 retrieves historical data from the predictive features data store 145 corresponding to the four quarters of 2015 and the four quarters of 2014.

At block 1708, the example model builder 150 determines whether to exclude a subset of the obtained historical data based on the selected model. For example, if, at block 1708, the model builder 150 determined that the model builder 150 is building an upfront projection model, then, at block 1710, the model builder excludes historical data corresponding to the gap between the current quarter and the quarter of interest. For example, if the quarter of interest is three quarters in the future (e.g., Q+3), then the gap is two quarters and historical data from the two previous quarters (e.g., Q+1 and Q+2) is excluded when training the model.

At block 1712, the model builder 150 generates a projection model. For example, the model builder 150 may determine a relationship between the included historical data and measured ratings to generate the projection model. For example, the model builder 150 may use any appropriate regression model, time-series model, etc. to represent the relationship between the included historical data and the measured ratings. In some examples, the model builder 150 trains and validates the parameters of the generated projection model by holding-out a subset of the data. For example, the model builder 150 may hold-out 30% of the included historical data and train the projection model using the remaining 70% of the historical. The model builder 150 may then use the hold-out data to validate (e.g., test) the projection model.

At block 1714, the model builder 150 determines whether the generated projection model satisfies a correlation threshold. For example, if the measured error between the actual ratings and the predicted ratings does not satisfy the correlation threshold, then control returns to block 1712 to perform additional training and testing iterations.

If, at block 1714, the model builder 150 determined that the measured error does satisfy the correlation threshold, then, at block 1716, the model builder 150 records the generated projection model in the models data store 155.

At block 1718, the example model builder 150 determines whether there is another demographic grouping to process for the selected projection model. If, at 1718, the model builder 150 determined that there is another demographic grouping to process, then control returns to block 1704 to select a demographic grouping to process.

Figure 18:
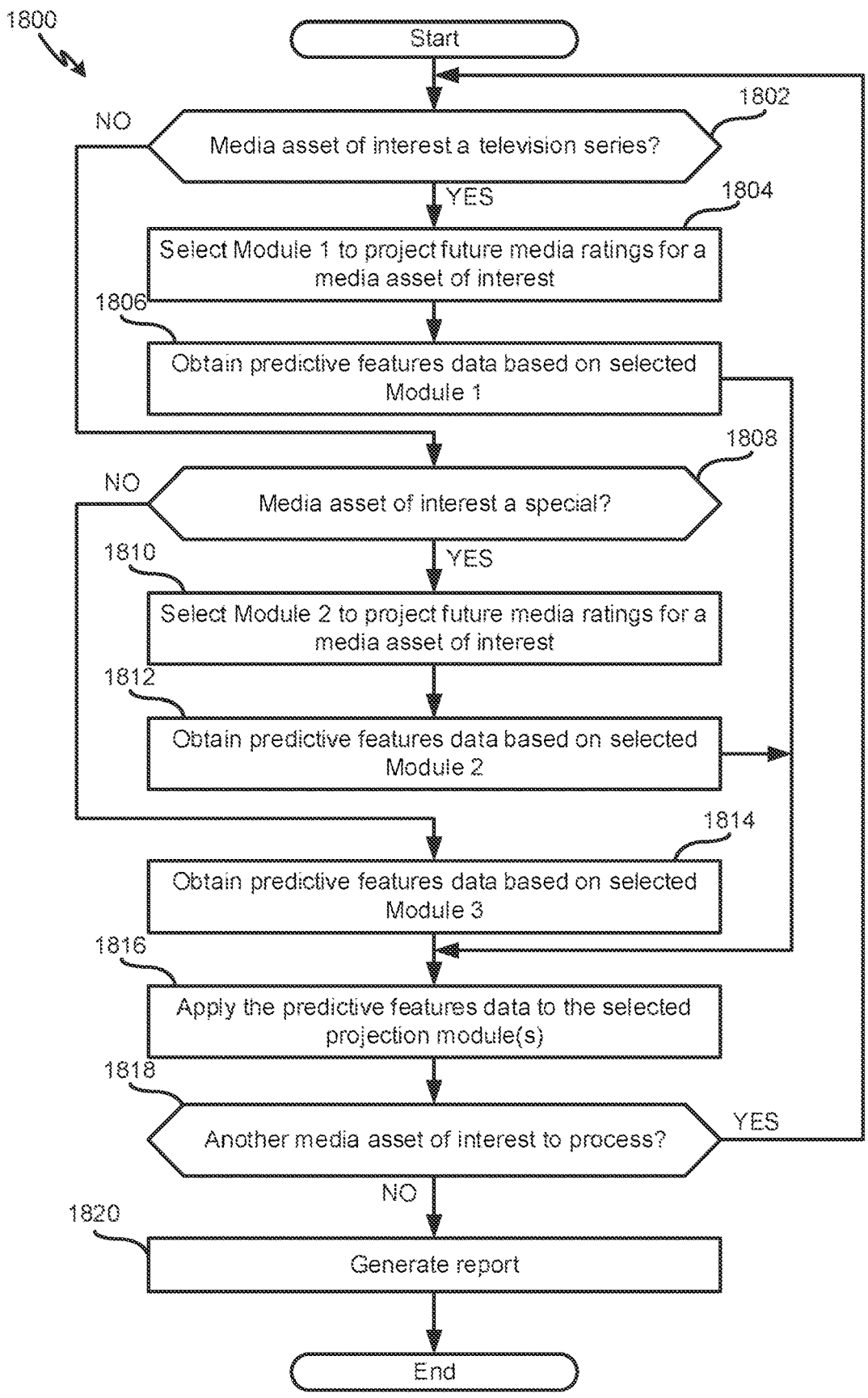
FIG. 18 is a flowchart representative of example machine-readable instructions that may be executed by the example future ratings projector of FIG. 1 to project ratings for future broadcasts of media.

FIG. 18 is a flowchart representative of example machine-readable instructions 1800 that may be executed by the example future ratings projector 160 of FIG. 1 to project ratings for future broadcasts of a media asset. The example process 1800 of the illustrated example of FIG. 18 begins at block 1802 when the example future ratings projector 160 determines whether the media asset of interest is a television series. For example, the future ratings projector 160 may retrieve the program characteristics of the media asset from the predictive features data store 145 (FIG. 1). If, at block 1802, the future ratings projector 160 determined that the media asset of interest is a television series, then, at block 1804, the future ratings projector 160 selects Module 1 to project the future media ratings of the media asset of interest. At block 1806, the future ratings projector 160 obtains the predictive features for the quarter of interest from the predictive features data store 145 based on Module 1. In some examples, the future ratings projector 160 may consult the example schema 1400 of the illustrated example of FIG. 14 to determine the predicted features associated with Module 1. Control then proceeds to block 1816 to apply the predictive features to the media asset of interest.

If, at block 1802, the future ratings projector 160 determined that the media asset of interest is not a television series, then, at block 1808, the future ratings projector 160 determines whether the media asset of interest is a special. For example, the future ratings projector 160 may retrieve the program attributes predictive features from the predictive features data store 145. If, at block 1808, the future ratings projector 160 determined that the media asset of interest is a special, then, at block 1810, the future ratings projector 160 selects Module 2 to project the future media ratings of the media asset of interest. At block 1812, the future ratings projector 160 obtains the predictive features for the quarter of interest from the predictive features data store 145 based on Module 2. In some examples, the future ratings projector 160 may consult the example schema 1500 of the illustrated example of FIG. 15 to determine the predicted features associated with Module 2. Control then proceeds to block 1816 to apply the predictive features to the media asset of interest.

If, at block 1808, the future ratings projector 160 determined that the media asset of interest is not a special, then, at block 1814, the future ratings projector 160 obtains the predictive features for the quarter of interest from the predictive features data store 145 based on Module 3. In some examples, the future ratings projector 160 may consult the example schema 1600 of the illustrated example of FIG. 16 to determine the predicted features associated with Module 3.

At block 1816, the example future ratings projector 160 applies the obtained predictive features for the quarter of interest to the selected projection module. At block 1818, the example program ratings estimator 160 determines whether there is another media asset of interest to process. If, at block 1818, the example future ratings projector 160 determined that there is another media asset of interest to process, then control returns to block 1802 to determine whether the media asset of interest is a television series.

If, at block 1818, the example future ratings projector 160 determined that there is not another media asset of interest to process, then, at block 1820, the future ratings projector 160 generates a report. For example, the future ratings projector 160 may generate a report including the projected ratings of the one or more media asset(s) of interest. In some examples, the future ratings projector 160 may generate a tool that can be used by client 170 to generate the report. The example process 1800 of FIG. 18 ends.

Figure 19:
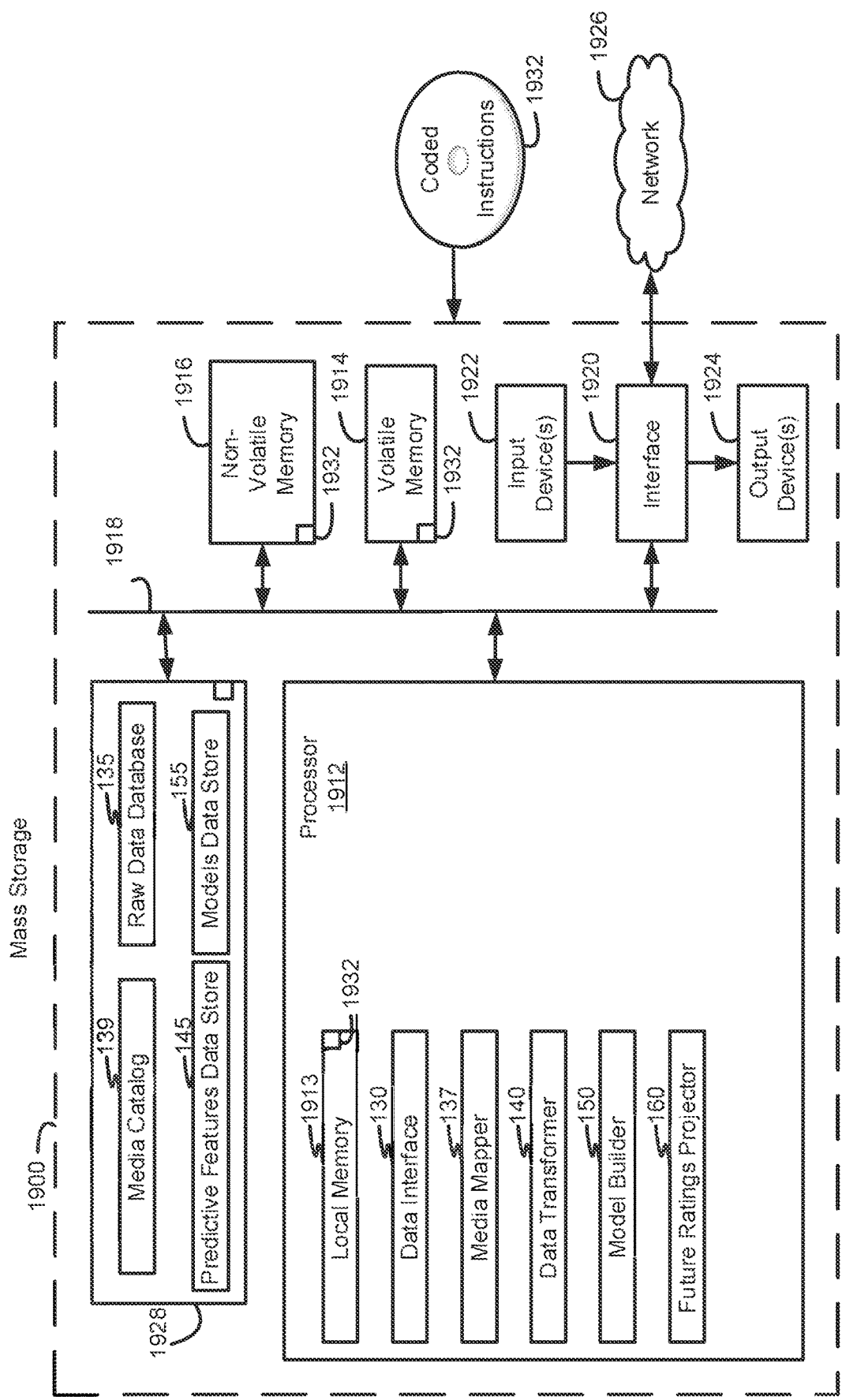
FIG. 19 is a block diagram of an example processing platform structured to execute the example machine-readable instructions of FIGS. 10-16 and/or 17 to implement the example central facility and/or the example data translator of FIGS. 1 and/or 4.

FIG. 19 is a block diagram of an example processor platform 1900 capable of executing the instructions of FIGS. 10-16 and/or 17 to implement the central facility 125 of FIG. 1 and/or the data transformer 140 of FIGS. 1 and/or 4. The processor platform 1900 can be, for example, a server, a personal computer, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache). The processor 1912 of the illustrated example executes the instructions to implement the example data interface 130, the example media mapper 137, the example data transformer 140, the example model builder 150, the example future ratings projector 160, the example ratings handler 405, the example attributes handler 410, the example social media handler 415, the example spending handler 420 and the example universe handler 425. The processor 1912 of the illustrated example is in communication with a main memory including a volatile memory 194 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID systems, and digital versatile disk (DVD) drives. The example mass storage 1928 implements the example raw data database 135, the example media catalog 139, the example predictive features data store 145 and the example models data store 155.

The coded instructions 1932 of FIGS. 10-16 and/or 17 may be stored in the mass storage device 1928, in the volatile memory 1914, in the non-volatile memory 1916, and/or on a removable tangible computer readable storage medium such as a CD or DVD.

From the foregoing, it will appreciate that the above disclosed methods, apparatus and articles of manufacture facilitate projecting ratings for future broadcasts of media. For example, disclosed examples include building a projection model based on historical audience measurement data and future quarters of interest. Examples disclosed herein may then apply data related to the quarter of interest and media of interest to project ratings for the media asset of interest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a data transformer to transform audience measurement data to determine normalized data;
    a model builder to train a machine-learning model for predicting ratings of a media asset for a future quarter of programming,
        wherein a gap between a current quarter and the future quarter is used as a basis to determine whether or not to exclude a portion of historical data in building the machine-learning model,
        wherein a classification of the media asset is used as a basis to select a predictive feature schema from a plurality of schemas, and
        wherein a subset of predictive features selected from the normalized data according to the predictive feature schema is used to train the machine-learning model; and
    a ratings projector to obtain predictive features data based on the selected predictive features schema, and to apply the obtained predictive features data to the machine-learning model to predict ratings for the media asset for the future quarter.

2. The apparatus of claim 1, wherein the gap between the current quarter and the future quarter is used as a basis to select the machine-learning model from a plurality of models.

3. The apparatus of claim 1, wherein the classification of the media asset is used as the basis to select the predictive feature schema from the plurality of schemas according to a determination, from the classification, of future programming information about the media asset, the future programming information indicating that the media asset is one of: a regular series program, a special program, or a program with no associated future programming information.

4. The apparatus of claim 3, wherein the selected predictive feature schema corresponds to the future programming information determined from the classification of the media asset.

5. The apparatus of claim 1, wherein the ratings projector obtaining the predictive features data based on the selected predictive features schema comprises:
    the ratings projector determining that the media asset is a regular series; and the ratings projector obtaining predictive features for the future quarter according to a schema for a regular series program.

6. The apparatus of claim 5, wherein the ratings projector applying the obtained predictive features data to the machine-learning model to predict the ratings for the media asset for the future quarter comprises the ratings projector applying historical program ratings, program characteristics, program schedule, and network ratings to the machine-learning module.

7. The apparatus of claim 1, wherein the ratings projector obtaining the predictive features data based on the selected predictive features schema comprises:
   the ratings projector determining that the media asset is a special program; and
   the ratings projector obtaining predictive features for the future quarter according to a schema for a special program special program.

8. The apparatus of claim 7, wherein the ratings projector applying the obtained predictive features data to the machine-learning model to predict the ratings for the media asset for the future quarter comprises the ratings projector applying special characteristics, social indicators, program schedule, network ratings, and advertising spending to the machine learning model.

9. The apparatus of claim 1, wherein the ratings projector obtaining the predictive features data based on the selected predictive features schema comprises:
   the ratings projector determining that the media asset is a program with no associated future programming information; and
   the ratings projector obtaining predictive features for the future quarter according to a schema for a special program special program.

10. The apparatus of claim 9, wherein the ratings projector applying the obtained predictive features data to the machine-learning model to predict the ratings for the media asset for the future quarter comprises the ratings projector applying program schedule, network ratings, advertising spending, and probabilistically-estimated program characteristics to the machine-learning model.

11. A method carried out by an apparatus comprising one or more processors for implementing a data transformer, a model builder, and a ratings projector, the method comprising:
   the data transformer transforming audience measurement data to determine normalized data;
   the model builder training a machine-learning model for predicting ratings of a media asset for a future quarter of programming,
   wherein a gap between a current quarter and the future quarter is used as a basis to determine whether or not to exclude a portion of historical data in building the machine-learning model,
   wherein a classification of the media asset is used as a basis to select a predictive feature schema from a plurality of schemas, and
   wherein a subset of predictive features selected from the normalized data according to the predictive feature schema is used to train the machine-learning model; and
   the ratings projector obtaining predictive features data based on the selected predictive features schema and applying the obtained predictive features data to the machine-learning model to predict ratings for the media asset for the future quarter.

12. The method of claim 11, wherein the gap between the current quarter and the future quarter is used as a basis to select the machine-learning model from a plurality of models.

13. The method of claim 11, wherein the classification of the media asset is used as the basis to select the predictive feature schema from the plurality of schemas according to a determination, from the classification, of future programming information about the media asset, the future programming information indicating that the media asset is one of: a regular series program, a special program, or a program with no associated future programming information,
   and wherein the selected predictive feature schema corresponds to the future programming information determined from the classification of the media asset.

14. The method of claim 11, wherein the ratings projector obtaining the predictive features data based on the selected predictive features schema comprises:
   the ratings projector determining that the media asset is a regular series; and
   the ratings projector obtaining predictive features for the future quarter according to a schema for a regular series program.

15. The method of claim 14, wherein the ratings projector applying the obtained predictive features data to the machine-learning model to predict the ratings for the media asset for the future quarter comprises the ratings projector applying historical program ratings, program characteristics, program schedule, and network ratings to the machine-learning module.

16. The method of claim 11, wherein the ratings projector obtaining the predictive features data based on the selected predictive features schema comprises:
   the ratings projector determining that the media asset is a special program; and
   the ratings projector obtaining predictive features for the future quarter according to a schema for a special program special program.

17. The method of claim 16, wherein the ratings projector applying the obtained predictive features data to the machine-learning model to predict the ratings for the media asset for the future quarter comprises the ratings projector applying special characteristics, social indicators, program schedule, network ratings, and advertising spending to the machine-learning model.

18. The method of claim 11, wherein the ratings projector obtaining the predictive features data based on the selected predictive features schema comprises:
   the ratings projector determining that the media asset is a program with no associated future programming information; and
   the ratings projector obtaining predictive features for the future quarter according to a schema for a special program special program.

19. The method of claim 18, wherein the ratings projector applying the obtained predictive features data to the machine-learning model to predict the ratings for the media asset for the future quarter comprises the ratings projector applying program schedule, network ratings, advertising spending, and probabilistically-estimated program characteristics to the machine-learning model.

20. A product of manufacture comprising a non-transitory computer-readable medium storing instructions thereon that, when executed by one or more processors of an apparatus, cause the apparatus to carry out operations including:
   transforming audience measurement data to determine normalized data;

training a machine-learning model for predicting ratings of a media asset for a future quarter of programming,
wherein a gap between a current quarter and the future quarter is used as a basis to determine whether or not to exclude a portion of historical data used to build the machine-learning model,
wherein a classification of the media asset is used as a basis to select to a predictive feature schema from a plurality of schemas, and
wherein a subset of predictive features selected from the normalized data according to the predictive feature schema is used to train the machine-learning model;
obtaining predictive features data based on the selected predictive features schema; and
applying the obtained predictive features data to the machine-learning model to predict ratings for the media asset for the future quarter.

* * * * *